US012640906B2

(12) United States Patent (10) Patent No.: US 12,640,906 B2

Kawai (45) Date of Patent: *May 26, 2026

(54) CIPHERTEXT CONVERSION SYSTEM, CIPHERTEXT CONVERSION METHOD, AND NON-TRANSITORY COMPUTER READABLE MEDIUM

(71) Applicant: MITSUBISHI ELECTRIC CORPORATION, Tokyo (JP)

(72) Inventor: Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 18/814,720

(22) Filed: Aug. 26, 2024

(65) Prior Publication Data

US 2024/0421975 A1 Dec. 19, 2024

Related U.S. Application Data

(63) Continuation of application No. PCT/JP2022/017726, filed on Apr. 13, 2022.

(51) Int. Cl.
*H04L 9/06* (2006.01)
*H04L 9/08* (2006.01)

(52) U.S. Cl.
CPC .......... *H04L 9/0618* (2013.01); *H04L 9/0894* (2013.01)

(58) Field of Classification Search
CPC ............................. H04L 9/0618; H04L 9/0894
See application file for complete search history.

(56) References Cited

U.S. PATENT DOCUMENTS

2016/0119292 A1 4/2016 Kaseda et al.
2016/0344708 A1 11/2016 Kawai et al.
(Continued)

FOREIGN PATENT DOCUMENTS

EP 2 779 523 A1 9/2014
EP 3 096 487 A1 11/2016
(Continued)

OTHER PUBLICATIONS

Ateniese et a. (Improved Proxy Re-encryption Schemes with Applications to Secure Distributed Storage, ACM Transactions on Information and System Security, vol. 9, No. 1, Feb. 2006, pp. 1â30.) (Year: 2006).*

(Continued)

*Primary Examiner* — Oleg Korsak

(74) *Attorney, Agent, or Firm* — Birch, Stewart, Kolasch & Birch, LLP

(57) ABSTRACT

A ciphertext conversion system (100) includes a conversion key generation device (600) and a conversion device (700). The conversion key generation device (600) performs encryption of a public-key encryption scheme using a public key and a first decryption enabling condition, so as to generate a first converted public-key ciphertext and a key corresponding to the first converted public-key ciphertext, performs encryption of a symmetric-key encryption scheme using a second symmetric-key encryption secret key as a plaintext and the key corresponding to the first converted public-key ciphertext as a secret key, so as to generate a first partial conversion key, and calculates, as a second partial conversion key, an exclusive-OR of a result of performing encryption using a first symmetric-key encryption secret key and first auxiliary information and a result of performing encryption using the second symmetric-key encryption secret key and second auxiliary information. The conversion (Continued)

device (700) calculates, as at least part of a converted symmetric-key ciphertext, an exclusive-OR of a symmetric-key ciphertext and the second partial conversion key, where the symmetric-key ciphertext is an exclusive-OR of a plain-text and a result of performing encryption using the first symmetric-key encryption secret key and the first auxiliary information.

10 Claims, 17 Drawing Sheets

(56) References Cited

U.S. PATENT DOCUMENTS

| | | |
|---|---|---|
| 2016/0380767 A1 | 12/2016 | Hayashi et al. |
| 2017/0323114 A1 | 11/2017 | Egorov et al. |
| 2018/0091301 A1 | 3/2018 | Nuñez et al. |
| 2018/0254892 A1 | 9/2018 | Egorov et al. |
| 2018/0254901 A1* | 9/2018 | Egorov ................. H04L 9/0822 |
| 2021/0126782 A1 | 4/2021 | Koseki et al. |
| 2021/0391981 A1 | 12/2021 | Okano et al. |
| 2022/0029795 A1 | 1/2022 | Kawai et al. |
| 2022/0385455 A1 | 12/2022 | Imabayashi |
| 2024/0048377 A1 | 2/2024 | Kawai |
| 2024/0421976 A1* | 12/2024 | Kawai ................... H04L 9/0894 |

FOREIGN PATENT DOCUMENTS

| | | |
|---|---|---|
| EP | 3 618 345 A1 | 3/2020 |
| EP | 3 836 479 A1 | 6/2021 |
| EP | 4 096 146 A1 | 11/2022 |
| JP | 2008-252745 A | 10/2008 |
| JP | 2016-90603 A | 5/2016 |
| JP | WO2018/225248 A1 | 12/2018 |
| JP | 6867718 B1 | 5/2021 |
| WO | WO 2013/069505 A1 | 5/2013 |
| WO | WO 2014/083784 A1 | 6/2014 |
| WO | WO 2015/107620 A1 | 7/2015 |
| WO | WO 2016/051591 A1 | 4/2016 |
| WO | WO 2017/193108 A2 | 11/2017 |
| WO | WO 2018/102382 A1 | 6/2018 |
| WO | WO 2018/208786 A1 | 11/2018 |
| WO | WO 2018/208787 A1 | 11/2018 |
| WO | WO 2020/085151 A1 | 4/2020 |
| WO | WO 2020/240630 A1 | 12/2020 |
| WO | WO 2022/244079 A1 | 11/2022 |

OTHER PUBLICATIONS

Almaiah et al. (A new hybrid text encryption approach over mobile ad hoc network, IJECE, 2020, pp. 6461-6471) (Year: 2020).*

International Search Report (PCT/ISA/210) issued in PCT/JP2022/017726, dated Jun. 28, 2022.

Syalim et al., "Improved Proxy Re-encryption Scheme for Symmetric Key Cryptography" in Cryptology ePrint Archive: Report 2021/276, 2017, pp. 1-15.

Syalim et al., "Realizing Proxy Re-encryption in the Symmetric World", Communications in Computer and Information Science 251, Nov. 2011, pp. 1-20.

Yu et al., "Achieving Flexibility for ABE with Outsourcing via Proxy Re-Encryption", ASIACCS'18, Jun. 2018, Session 16: Applied Crypto 2, pp. 659-672.

English translation of the International Search Report for International Application No. PCT/JP2021/018664, dated Aug. 3, 2021.

English translation of the International Search Report for International Application No. PCT/JP2022/017725, dated Jun. 28, 2022.

German Office Action for German Application No. 112021007337.0, dated Aug. 13, 2024, with an English translation.

\* cited by examiner

100: CIPHERTEXT CONVERSION SYSTEM

300: COMMON PARAMETER GENERATION DEVICE

500: CIPHERTEXT GENERATION DEVICE

700: CONVERSION DEVICE

600: CONVERSION KEY GENERATION DEVICE

400: USER SECRET KEY GENERATION DEVICE

800: DECRYPTION DEVICE

101: INTERNET

200: SYMMETRIC SECRET KEY GENERATION DEVICE

NETWORK

START

S501 RECEIVE SECRET KEY sk

S502 RECEIVE PLAINTEXT M

S503 GENERATE AUXILIARY INFORMATION auxC, AND ENCRYPT PLAINTEXT M IN COUNTER MODE USING BLOCK CIPHER ENCRYPTION SCTRENC $Csk = SCTRENC(sk, auxC) + M$ S504 TRANSMIT SYMMETRIC-KEY CIPHRTEXT Csk AND AUXILIARY INFORMATION auxC TO EACH DEVICE

END

Fig. 14

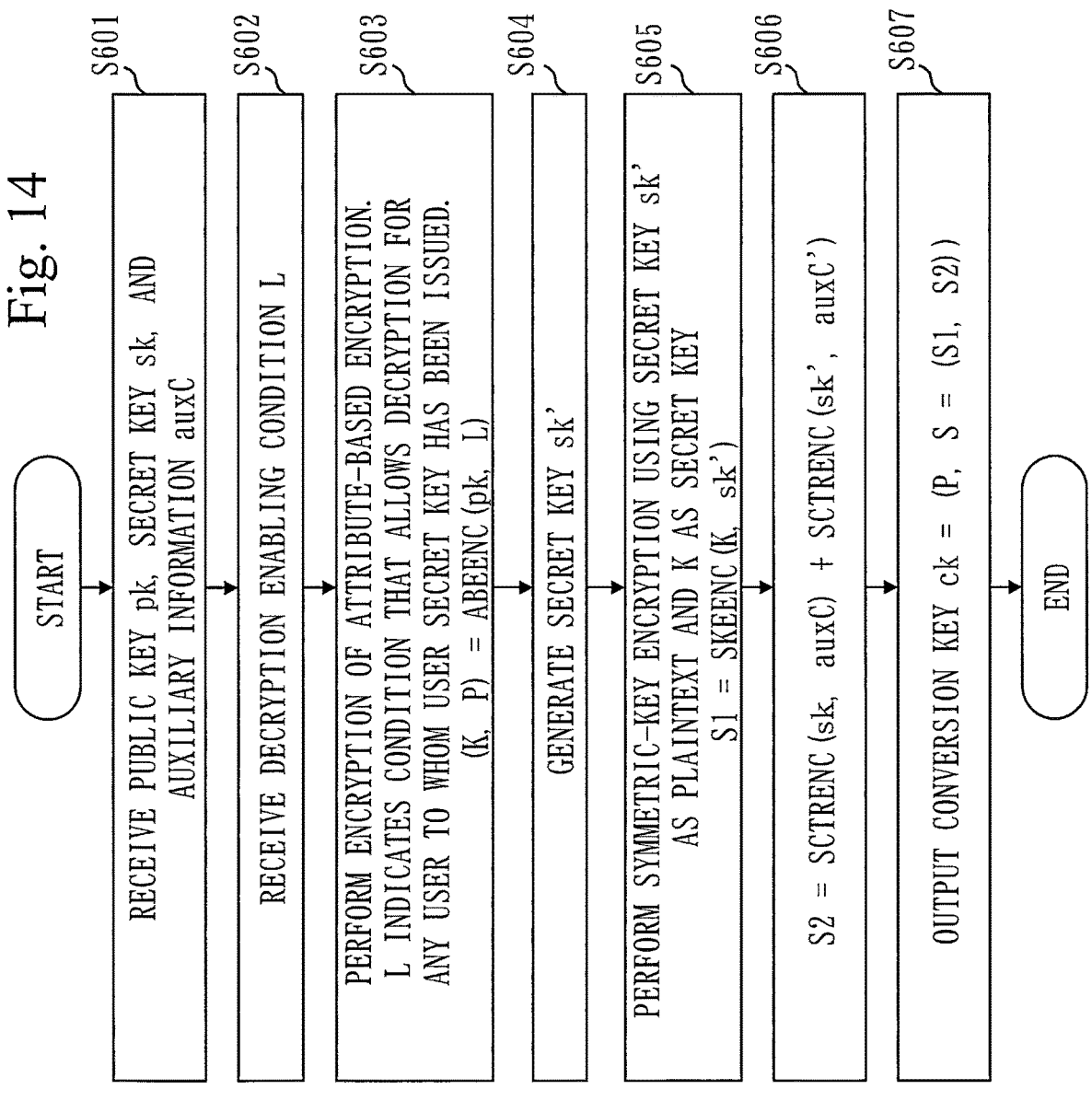

START

S601 — RECEIVE PUBLIC KEY pk, SECRET KEY sk, AND AUXILIARY INFORMATION auxC

S602 — RECEIVE DECRYPTION ENABLING CONDITION L

S603 — PERFORM ENCRYPTION OF ATTRIBUTE-BASED ENCRYPTION. L INDICATES CONDITION THAT ALLOWS DECRYPTION FOR ANY USER TO WHOM USER SECRET KEY HAS BEEN ISSUED. (K, P) = ABEENC (pk, L)

S604 — GENERATE SECRET KEY sk'

S605 — PERFORM SYMMETRIC-KEY ENCRYPTION USING SECRET KEY sk' AS PLAINTEXT AND K AS SECRET KEY S1 = SKEENC (K, sk')

S606 — S2 = SCTRENC (sk, auxC) + SCTRENC (sk', auxC')

S607 — OUTPUT CONVERSION KEY ck = (P, S = (S1, S2))

END

START

S701 — RECEIVE PUBLIC KEY pk AND CONVERSION KEY ck = (P, S = (S1, S2))

S702 — RECEIVE SYMMETRIC-KEY CIPHERTEXT Csk RECEIVE DECRYPTION ENABLING CONDITION L'

S703 —

Csk' = Csk + S2
     = SCTRENC (sk, auxC) + M
     + SCTRENC (sk, auxC) + SCTRENC (sk', auxC')
     = SCTRENC (sk', auxC') + M P' = ABEDER (pk, P, L')

S704 — OUTPUT CONVERTED PUBLIC-KEY CIPHERTEXT AS Cpk = (P', S1) AND CONVERTED SYMMETRIC-KEY CIPHERTEXT AS (Csk', auxC')

END

START

RECEIVE CONVERTED PUBLIC-KEY CIPHERTEXT Cpk = (P, S1)
AND CONVERTED SYMMETRIC-KEY CIPHERTEXT (Csk', auxC') — S801

RECEIVE USER SECRET KEY $sk_\Gamma$ — S802

K = ABEDEC($sk_\Gamma$, P')

sk' = SKEDEC(K, S1)

M = Csk' + SCTRENC(sk', auxC') — S803

OUTPUT PLAINTEXT M — S804

END

CIPHERTEXT CONVERSION SYSTEM, CIPHERTEXT CONVERSION METHOD, AND NON-TRANSITORY COMPUTER READABLE MEDIUM

CROSS REFERENCE TO RELATED APPLICATIONS

This application is a Continuation of PCT International Application No. PCT/JP2022/017726, filed on Apr. 13, 2022, all of which is hereby expressly incorporated by reference into the present application.

TECHNICAL FIELD

The present disclosure relates to a ciphertext conversion system, a ciphertext conversion method, and a ciphertext conversion program.

BACKGROUND ART

A proxy re-encryption (PRE) system is a system that delegates an authority to decrypt a ciphertext to another person without decrypting the ciphertext. Non-Patent Literature 1 discloses a PRE scheme in any attribute-based encryption scheme (attribute-based PRE, ABPRE). By using the technique disclosed in Non-Patent Literature 1, proxy encryption can be realized between attribute-based encryption schemes that are mutually different. Non-Patent Literature 2 discloses a technique that changes a key without decrypting a ciphertext of symmetric-key encryption.

CITATION LIST

Non-Patent Literature

Non-Patent Literature 1: Z. Yu, M. H. Au, R. Yang, J. Lai, Q. Xu, "Achieving Flexibility for ABE with Outsourcing via Proxy Re-Encryption", ASIACCS' 18, June 2018
Non-Patent Literature 2: A. Syalim, T. Nishide, and K. Sakurai, "Realizing Proxy Re-encryption in the Symmetric World", Communications in Computer and Information Science 251, November 2011

SUMMARY OF INVENTION

Technical Problem

A typical proxy re-encryption scheme such as the scheme disclosed in Non-Patent Literature 1 is a technique that converts a ciphertext of a certain public-key encryption scheme to a ciphertext of another public-key encryption scheme. The technique disclosed in Non-Patent Literature 2 is a technique that converts a ciphertext of a symmetric-key encryption scheme to a ciphertext of the symmetric-key encryption scheme. That is, to convert a ciphertext of a symmetric-key encryption scheme to a ciphertext of a public-key encryption scheme using the existing techniques, it is necessary to decrypt the ciphertext of the symmetric-key encryption scheme once and then encrypt a decrypted plaintext by the public-key encryption scheme. Therefore, a problem of the existing techniques is that a plaintext is exposed when the ciphertext of the symmetric-key encryption scheme is converted to the ciphertext of the public-key encryption scheme, so that security is low.

An object of the present disclosure is to convert, without decryption, a ciphertext encrypted by a symmetric-key encryption scheme to a ciphertext of a public-key encryption scheme.

Solution to Problem

A ciphertext conversion system according to the present disclosure includes
a conversion key generation device including
a conversion destination setting unit to perform encryption of a public-key encryption scheme using a public key and a first decryption enabling condition, so as to generate a first converted public-key ciphertext and a key corresponding to the first converted public-key ciphertext; and
a key generation unit to perform encryption of a symmetric-key encryption scheme using a second symmetric-key encryption secret key as a plaintext and the key corresponding to the first converted public-key ciphertext as a secret key, so as to generate a first partial conversion key, and
calculate, as a second partial conversion key, an exclusive-OR of a value calculated by performing encryption in a counter mode of a block cipher using a first symmetric-key encryption secret key and first auxiliary information and a value calculated by performing encryption in the counter mode of the block cipher using the second symmetric-key encryption secret key and second auxiliary information; and
a conversion device including
a conversion unit to calculate, as at least part of a converted symmetric-key ciphertext to be used to decrypt a plaintext used in generating a symmetric-key ciphertext, an exclusive-OR of the symmetric-key ciphertext and the second partial conversion key, the symmetric-key ciphertext being an exclusive-OR of the plaintext and a value calculated by performing encryption in the counter mode of the block cipher using the first symmetric-key encryption secret key and the first auxiliary information.

Advantageous Effects of Invention

According to the present disclosure, an exclusive-OR of a symmetric-key ciphertext and a second partial conversion key is generated as a converted symmetric-key ciphertext. When the second partial conversion key is calculated, a second symmetric-key encryption secret key is used. The second symmetric-key encryption secret key is decrypted by decrypting a first partial conversion key using a key corresponding to a first converted public-key ciphertext. The first converted public-key ciphertext is a ciphertext of a public-key encryption scheme. Therefore, according to the present disclosure, a ciphertext encrypted by a symmetric-key encryption scheme can be converted, without being decrypted, to a ciphertext of a public-key encryption scheme.

BRIEF DESCRIPTION OF DRAWINGS

FIG. 14 is a flowchart illustrating operation of the conversion key generation device 600 according to Embodiment 1;

DESCRIPTION OF EMBODIMENTS

In the description and drawings of embodiments, the same elements and corresponding elements are denoted by the same reference sign. The description of elements denoted by the same reference sign will be suitably omitted or simplified. Arrows in figures mainly indicate flows of data or signals or flows of processing. "Device or "unit" may be suitably interpreted as "device", "equipment", "circuit", "step", "procedure", "process", or "circuitry".

Embodiment 1

*Description of Configuration*

In this embodiment, a ciphertext conversion system 100 will be disclosed. An overview of this embodiment will be described below with reference to the drawings.

Figure 1:
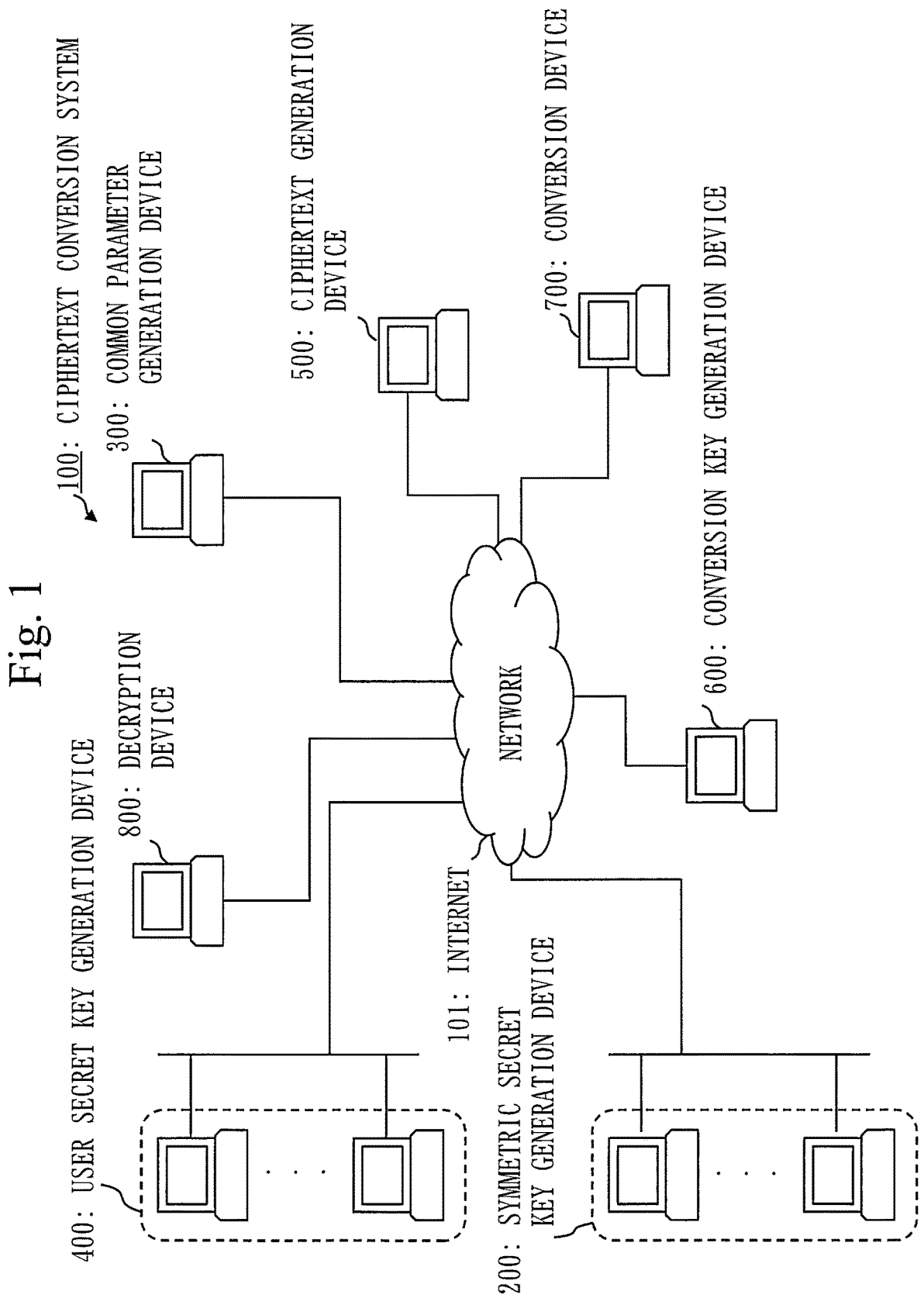
FIG. 1 is a figure illustrating an example of a configuration of a ciphertext conversion system 100 according to Embodiment 1.

FIG. 1 is a block diagram illustrating a configuration of the ciphertext conversion system 100 according to this embodiment. As illustrated in FIG. 1, the ciphertext conversion system 100 includes a plurality of symmetric secret key generation devices 200, a common parameter generation device 300, a plurality of user secret key generation devices 400, a ciphertext generation device 500, a conversion key generation device 600, a conversion device 700, and a decryption device 800.

The devices constituting the ciphertext conversion system 100 may be installed in a local area network (LAN) or the like installed in the same company, instead of being connected with one another through Internet 101 so as to allow communication. At least two of the devices constituting the ciphertext conversion system 100 may be integrally configured as appropriate.

The Internet 101 is a communication channel that connects the plurality of symmetric secret key generation devices 200, the common parameter generation device 300, the plurality of user secret key generation devices 400, the ciphertext generation device 500, the conversion key generation device 600, the conversion device 700, and the decryption device 800 so as to allow communication. The Internet 101 is a specific example of a network. In place of the Internet 101, other types of networks may be used.

The symmetric secret key generation device 200 is, as a specific example, a personal computer (PC), and is also called a symmetric-key encryption secret key generation device. The symmetric secret key generation device 200 is a computer that generates a secret key sk, and transmits the generated secret key sk to the ciphertext generation device 500 and the conversion key generation device 600. The secret key sk is also called a symmetric-key encryption secret key.

The common parameter generation device 300 is, as a specific example, a PC, and is a computer that generates common parameters to be used in the ciphertext conversion system 100, and transmits information indicating the generated common parameters to the plurality of user secret key generation devices 400, the conversion key generation device 600, and the conversion device 700 via the Internet 101. The common parameters include a master secret key msk and a public key pk. The information indicating the common parameters may be sent directly to each device by postal mail or the like, instead of being transmitted via the Internet 101. The term data and the term information may have substantially the same meaning.

The user secret key generation device 400 is, as a specific example, a PC. The user secret key generation device 400 is a computer that receives the master secret key msk from the common parameter generation device 300, accepts, as input, information indicating an attribute parameter $\Gamma$, generates a user secret key $sk_\Gamma$ using the master secret key msk and the attribute parameter $\Gamma$, and transmits the generated user secret key $sk_\Gamma$ to the decryption device 800.

The ciphertext generation device 500 is a device that functions as a data encryption device, is a PC as a specific example, and is also called a symmetric-key ciphertext generation device. The ciphertext generation device 500 receives the secret key sk from the symmetric secret key generation device 200, and also accepts, as input, information indicating a plaintext M. The ciphertext generation device 500 is a computer that generates auxiliary information auxC, generates a symmetric-key ciphertext Csk using the secret key sk, the plaintext M, and the auxiliary information auxC, transmits the generated symmetric-key ciphertext Csk to the conversion device 700, and transmits the generated auxiliary information auxC to the conversion key generation device 600. The auxiliary information auxC is also called ciphertext auxiliary information.

The conversion key generation device 600 is, as a specific example, a PC. The conversion key generation device 600 is a computer that receives the public key pk from the common parameter generation device 300, receives the secret key sk from the symmetric secret key generation device 200, receives the auxiliary information auxC from the ciphertext generation device 500, accepts, as input, information indicating a decryption enabling condition L, generates auxiliary information auxC', generates a conversion key ck based on the received data, the decryption enabling condition L, and the generated auxiliary information auxC', and transmits the generated conversion key ck to the conversion device 700.

The conversion device 700 is, as a specific example, a PC. The conversion device 700 is a computer that receives the conversion key ck from the conversion key generation device 600, receives the symmetric-key ciphertext Csk from the ciphertext generation device 500, accepts, as input, information indicating a decryption enabling condition L', generates a converted symmetric-key ciphertext (Csk', auxC') and a converted public-key ciphertext Cpk using the received data and the decryption enabling condition L', and transmits the generated converted symmetric-key ciphertext Csk' and converted public-key ciphertext Cpk to the decryption device 800. In the decryption enabling condition L', a condition corresponding to a user who can decrypt the converted ciphertexts is expressed by a logical expression.

The decryption device 800 is, as a specific example, a PC. The decryption device 800 is a computer that receives the converted symmetric-key ciphertext (Csk', auxC') and the converted public-key ciphertext Cpk from the conversion device 700, also receives the user secret key sk$_\Gamma$ from the user secret key generation device 400, and outputs a result of decrypting the plaintext M using the received data.

Configurations in this embodiment will be described below.

Figure 2:
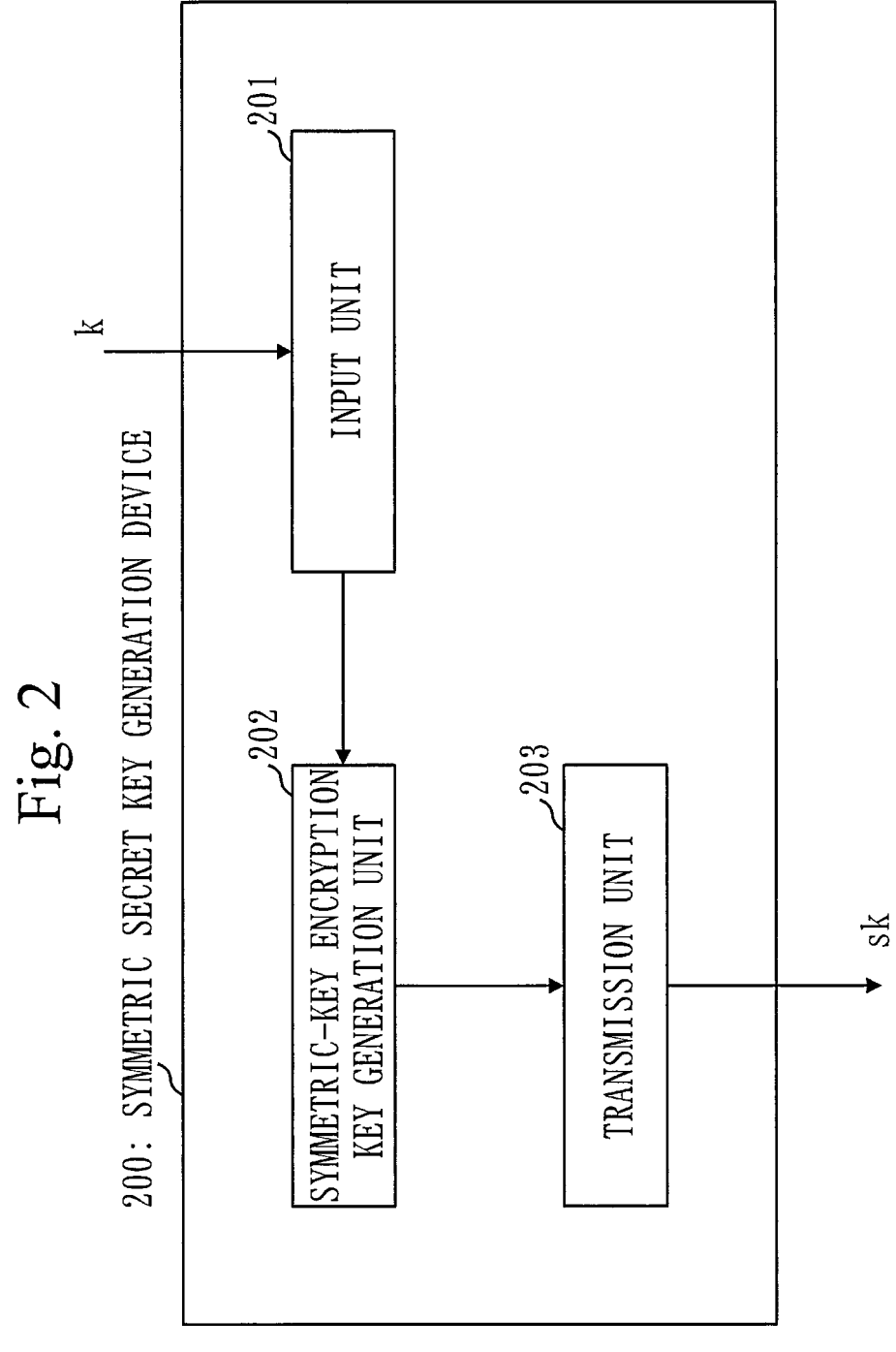
FIG. 2 is a figure illustrating an example of a configuration of a symmetric secret key generation device 200 according to Embodiment 1.

FIG. 2 is a block diagram illustrating an example of a configuration of the symmetric secret key generation device 200. As illustrated in FIG. 2, the symmetric secret key generation device 200 includes an input unit 201, a symmetric-key encryption key generation unit 202, and a transmission unit 203. Although not illustrated, the symmetric secret key generation device 200 includes a recording medium to store data used in each unit of the symmetric secret key generation device 200.

The input unit 201 accepts input of information indicating a key bit length k to be used in the ciphertext conversion system 100.

The symmetric-key encryption key generation unit 202 generates the secret key sk. The secret key sk is used as a fundamental of operations in the ciphertext conversion system 100. Although not illustrated, the symmetric-key encryption key generation unit 202 may include a random number generation function or the like to generate the secret key sk.

The transmission unit 203 transmits the secret key sk generated by the symmetric-key encryption key generation unit 202 to the ciphertext generation device 500 and the conversion key generation device 600.

Figure 3:
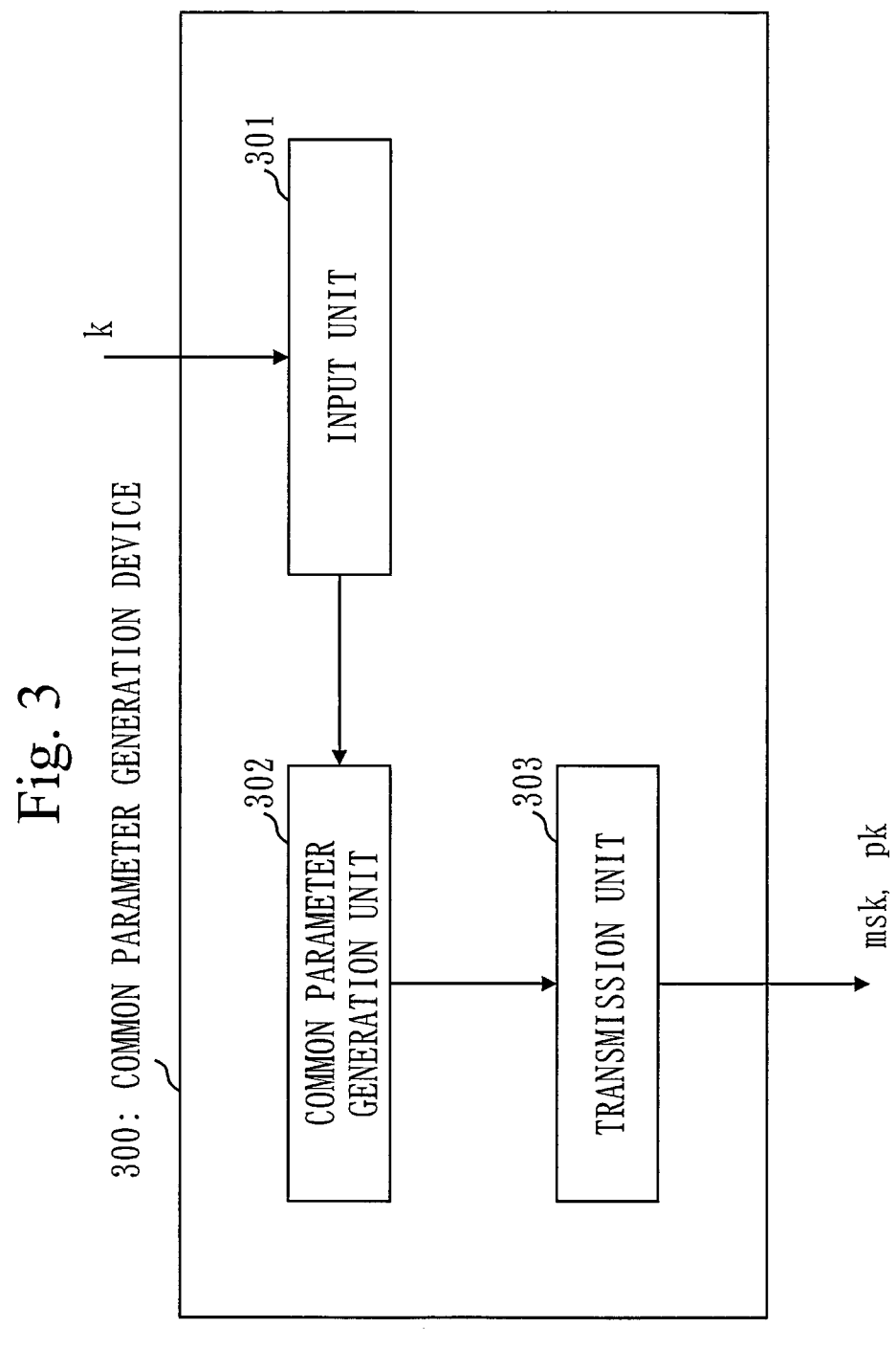
FIG. 3 is a figure illustrating an example of a configuration of a common parameter generation device 300 according to Embodiment 1.

FIG. 3 is a block diagram illustrating an example of a configuration of the common parameter generation device 300. As illustrated in FIG. 3, the common parameter generation device 300 includes an input unit 301, a common parameter generation unit 302, and a transmission unit 303. Although not illustrated, the common parameter generation device 300 includes a recording medium to store data used in each unit of the common parameter generation device 300.

The input unit 301 accepts input of information indicating the key bit length k to be used in the ciphertext conversion system 100.

The common parameter generation unit 302 generates the public key pk and the master secret key msk. The public key pk and the master secret key msk are used as fundamentals of operations in the ciphertext conversion system 100. Although not illustrated, the common parameter generation unit 302 may include a random number generation function or the like to generate the public key pk and the master secret key msk.

The transmission unit 303 transmits the public key pk generated by the common parameter generation unit 302 to the conversion device key generation device 600 and the conversion device 700. The transmission unit 303 also transmits the master secret key msk generated by the common parameter generation unit 302 to each of the plurality of user secret key generation devices 400.

Figure 4:
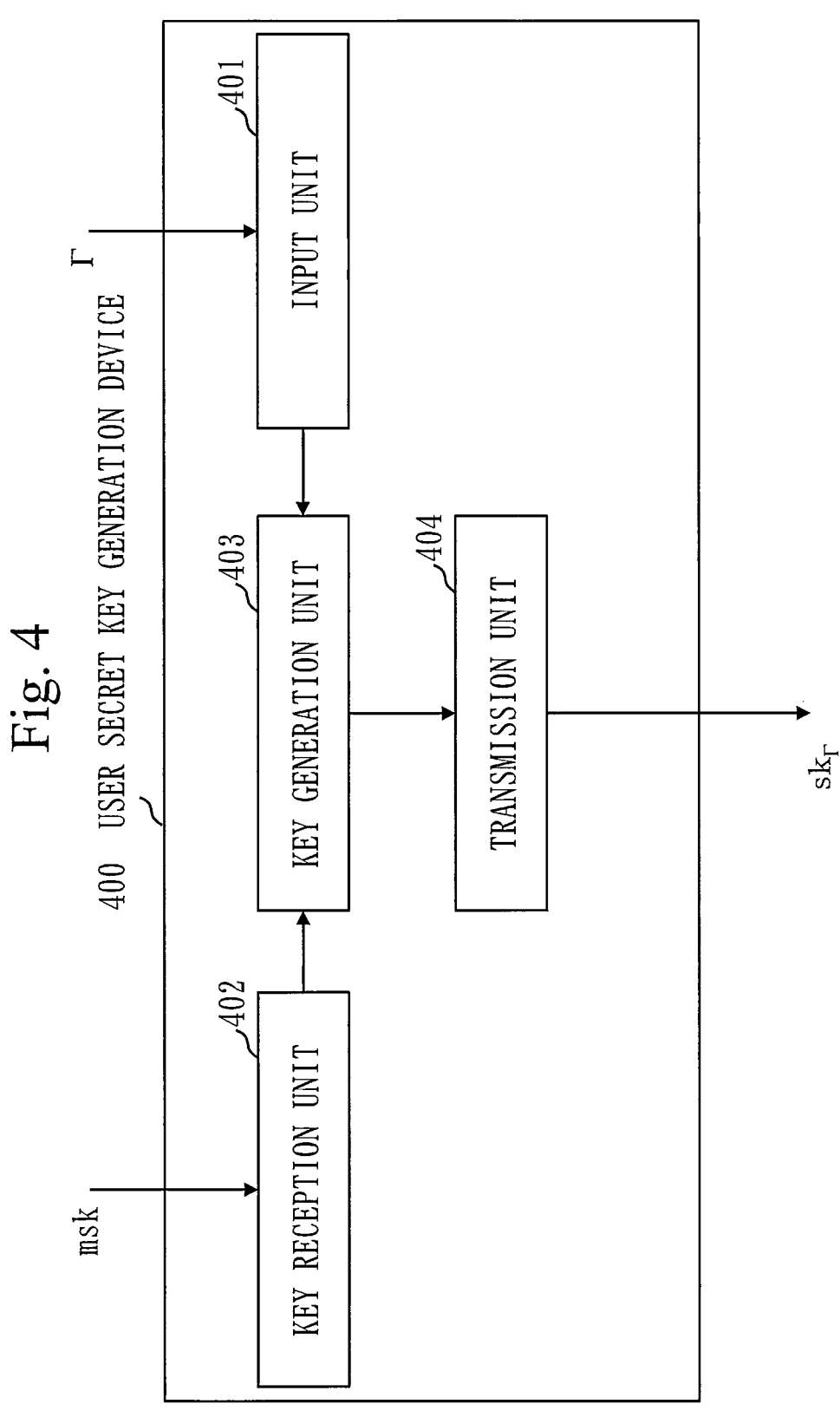
FIG. 4 is a figure illustrating an example of a configuration of a user secret key generation device 400 according to Embodiment 1.

FIG. 4 is a block diagram illustrating an example of a configuration of the user secret key generation device 400. As illustrated in FIG. 4, the user secret key generation device 400 includes an input unit 401, a key reception unit 402, a key generation unit 403, and a transmission unit 404. Although not illustrated, the user secret key generation device 400 includes a recording medium to store data used in each unit of the user secret key generation device 400.

The input unit 401 accepts input of information indicating the attribute parameter Γ.

The key reception unit 402 receives the master secret key msk.

The key generation unit 403 generates the user secret key sk$_\Gamma$ using the attribute parameter Γ and the master secret key msk. Although not illustrated, the key generation unit 403 may include a random number generation function or the like to generate the user secret key sk$_\Gamma$.

The transmission unit 404 transmits the user secret key sk$_\Gamma$ generated by the key generation unit 403 to the decryption device 800.

Figure 5:
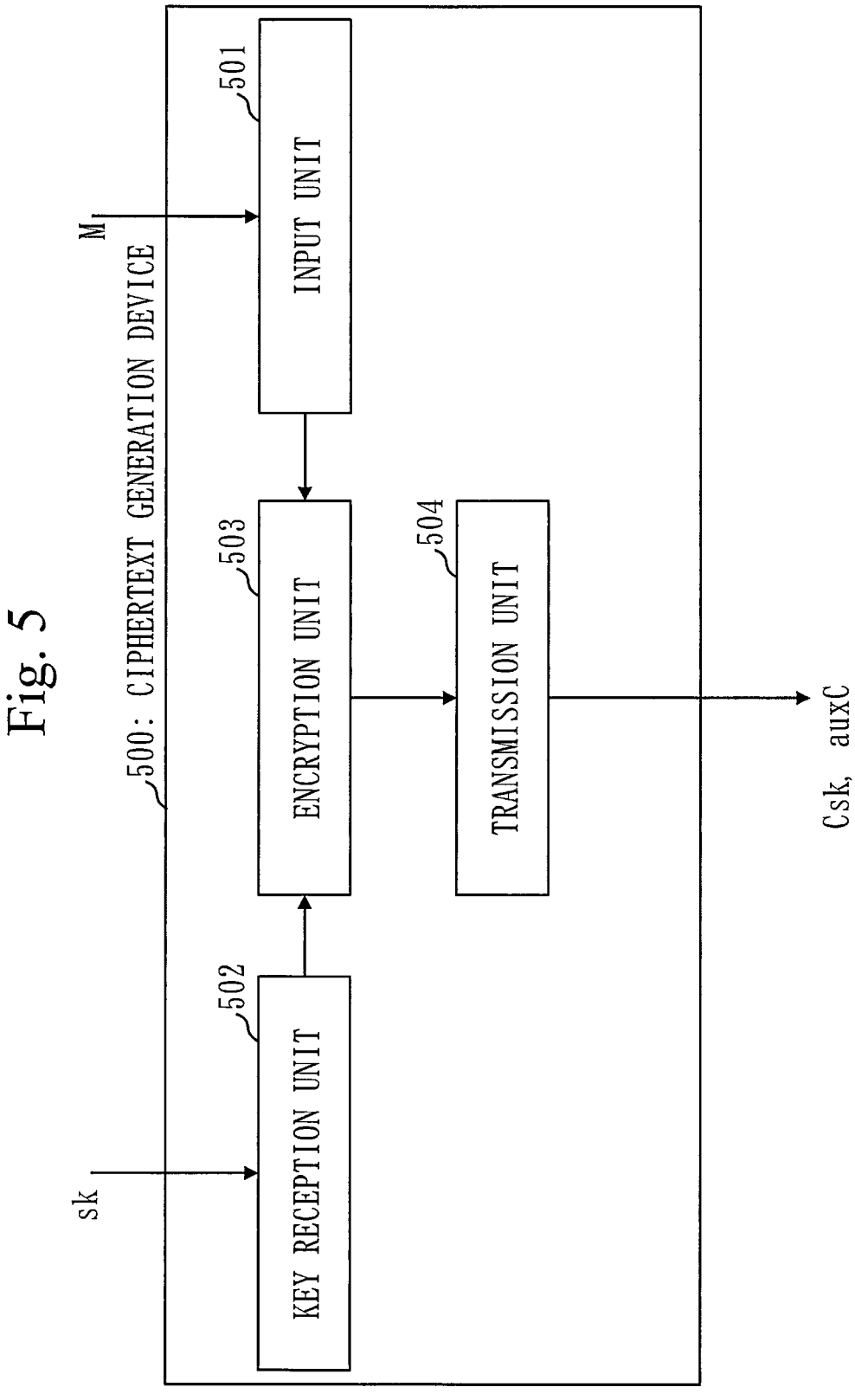
FIG. 5 is a figure illustrating an example of a configuration of a ciphertext generation device 500 according to Embodiment 1.

FIG. 5 is a block diagram illustrating an example of a configuration of the ciphertext generation device 500. As illustrated in FIG. 5, the ciphertext generation device 500 includes an input unit 501, a key reception unit 502, an encryption unit 503, and a transmission unit 504. Although not illustrated, the ciphertext generation device 500 includes a recording medium to store data used in each unit of the ciphertext generation device 500.

The input unit 501 accepts input of information indicating the plaintext M.

The key reception unit 502 receives the secret key sk.

The encryption unit 503 generates the auxiliary information auxC, generates a symmetric-key ciphertext Csk using the plaintext M, the secret key sk, and the generated auxiliary information auxC. Although not illustrated, the encryption unit 503 may include a random number generation function or the like to generate the symmetric-key ciphertext Csk.

The transmission unit 504 transmits the symmetric-key ciphertext Csk generated by the encryption unit 503 to the conversion device 700, and transmits the auxiliary information auxC generated by the encryption unit 503 to the conversion key generation device 600.

Figure 6:
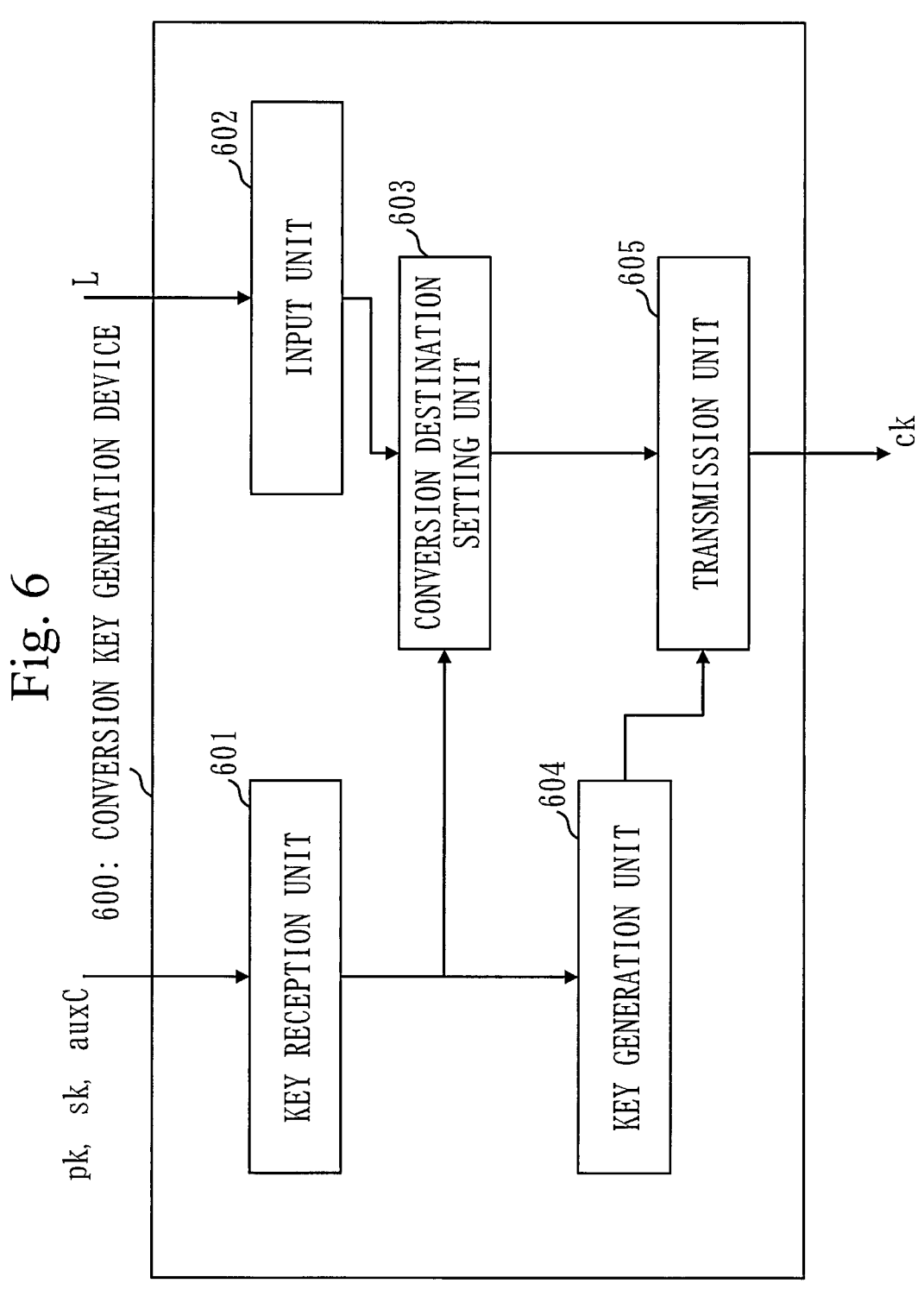
FIG. 6 is a figure illustrating an example of a configuration of a conversion key generation device 600 according to Embodiment 1.

FIG. 6 is a block diagram illustrating an example of a configuration of the conversion key generation device 600. As illustrated in FIG. 6, the conversion key generation device 600 includes a key reception unit 601, an input unit 602, a conversion destination setting unit 603, a key generation unit 604, and a transmission unit 605. Although not illustrated, the conversion key generation device 600 includes a recording medium to store data used in each unit of the conversion key generation device 600.

The key reception unit 601 receives the public key pk, the secret key sk, and the auxiliary information auxC.

The input unit 602 accepts, as input, information indicating the decryption enabling condition L.

The conversion destination setting unit 603 generates P, which is part of the conversion key ck, using the public key pk and the decryption enabling condition L. At this time, the conversion destination setting unit 603 performs encryption of a public-key encryption scheme using the public key pk and a first decryption enabling condition so as to generate a first converted public-key ciphertext and a key corresponding to the first converted public-key ciphertext. The public-key encryption scheme is, as a specific example, a functional encryption scheme or an attribute-based encryption scheme that allows an access range to be set.

The key generation unit 604 generates S, which is part of the conversion key ck, using the secret key sk and the auxiliary information auxC. Although not illustrated, each of the conversion destination setting unit 603 and the key generation unit 604 may include a random number generation function or the like to generate part of the conversion key ck.

Specifically, the key generation unit 604 first performs encryption of a symmetric-key encryption scheme using a second symmetric-key encryption secret key as a plaintext and the key corresponding to the first converted public-key ciphertext as a secret key so as to generate a first partial conversion key.

Next, the key generation unit 604 calculates, as a second partial conversion key, an exclusive-OR of a value calculated by performing encryption in a counter mode of a block cipher using a first symmetric-key encryption secret key and first auxiliary information and a value calculated by encryption in the counter mode of the block cipher using the second symmetric-key encryption secret key and second auxiliary information.

The transmission unit 605 sets an aggregation of the part of the conversion key generated by the conversion destination setting unit 603 and the part of the conversion key generated by the key generation unit 604 as the conversion key ck (=(P, S)), and transmits the conversion key ck to the conversion device 700.

Figure 7:
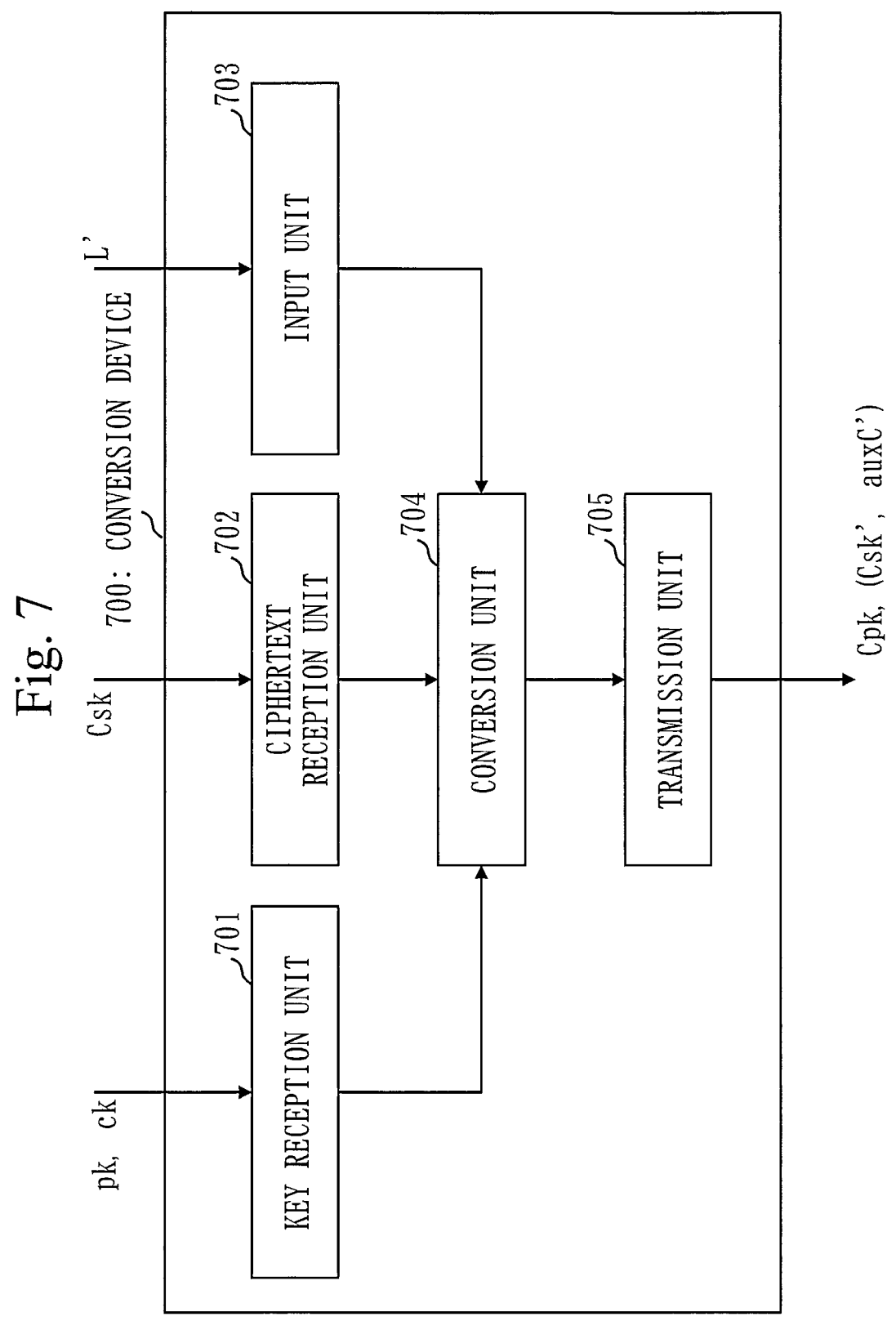
FIG. 7 is a figure illustrating an example of a configuration of a conversion device 700 according to Embodiment 1.

FIG. 7 is a block diagram illustrating an example of a configuration of the conversion device 700. As illustrated in FIG. 7, the conversion device 700 includes a key reception unit 701, a ciphertext reception unit 702, an input unit 703, a conversion unit 704, and a transmission unit 705. Although not illustrated, the conversion device 700 includes a recording medium to store data used in each unit of the conversion device 700.

The key reception unit 701 receives the public key pk and the conversion key ck.

The ciphertext reception unit 702 receives the symmetric-key ciphertext Csk.

The input unit 703 accepts input of information indicating the decryption enabling condition L'.

The conversion unit 704 converts the symmetric-key ciphertext Csk to Csk' using the conversion key ck, and sets a decryption enabling condition in P using the public key pk and the decryption enabling condition L' so as to convert P to P'. P' is part of the converted public-key ciphertext Cpk.

The conversion unit 704 calculates an exclusive-OR of the symmetric-key ciphertext Csk and the second partial conversion key as at least part of a converted symmetric-key ciphertext to be used to decrypt the plaintext M used in generating a symmetric-key ciphertext. The symmetric-key ciphertext Csk is an exclusive-OR of the plaintext M and a value calculated by performing encryption in the counter mode of the block cipher using the first symmetric-key encryption secret key and the first auxiliary information. The converted symmetric-key ciphertext may be composed of at least part of the converted symmetric-key ciphertext and the second auxiliary information.

The conversion unit 704 may perform delegation conversion of the attribute-based encryption scheme using the public key pk, the first converted public-key ciphertext, and a second decryption enabling condition so as to generate a second converted public-key ciphertext. The second decryption enabling condition is a condition that is more restrictive than the first decryption enabling condition.

The transmission unit 705 outputs the converted public-key ciphertext Cpk and the converted symmetric-key ciphertext (Csk', auxC').

Figure 8:
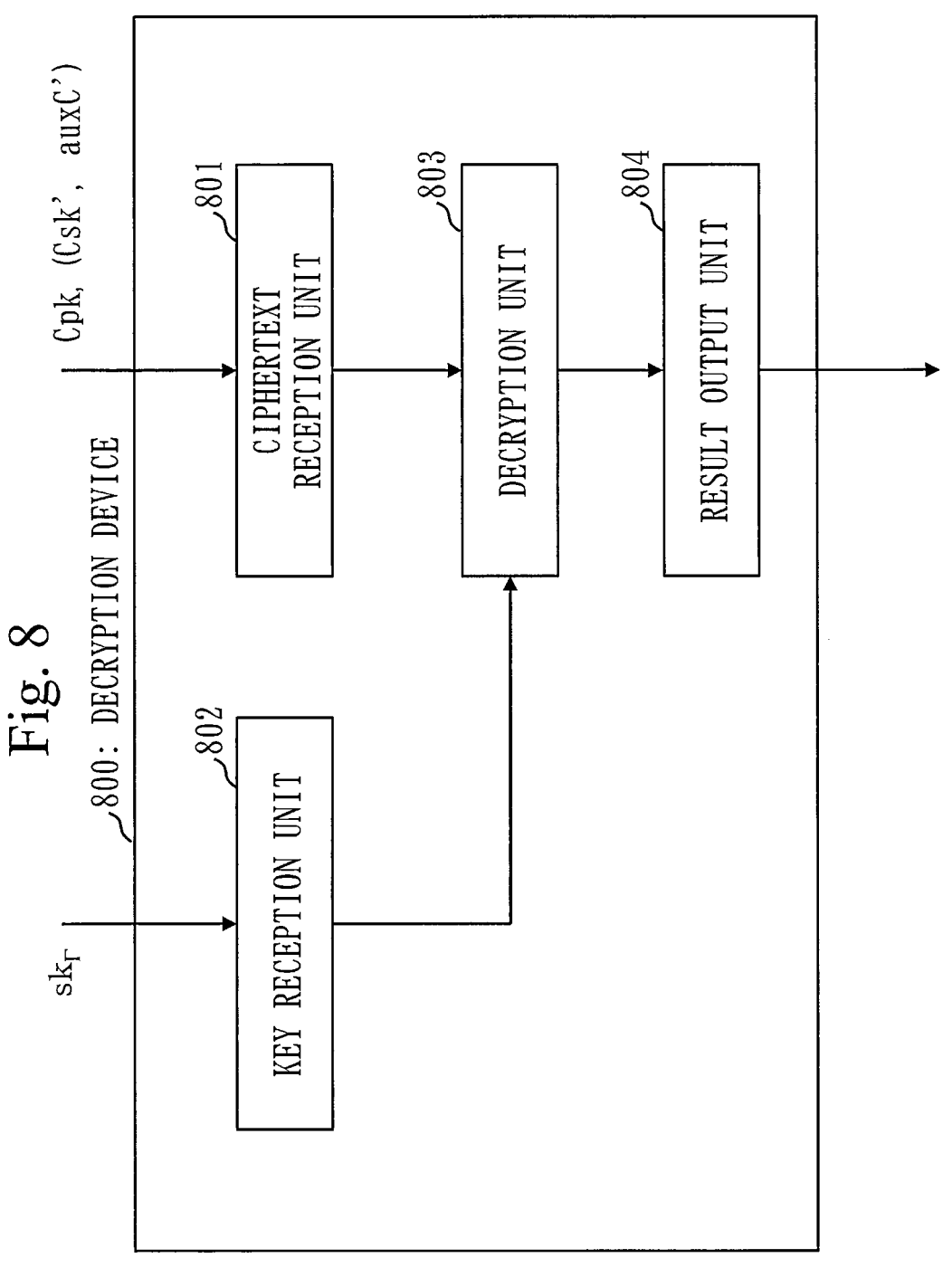
FIG. 8 is a figure illustrating an example of a configuration of a decryption device 800 according to Embodiment 1.

FIG. 8 is a block diagram illustrating an example of a configuration of the decryption device 800. As illustrated in FIG. 8, the decryption device 800 includes a ciphertext reception unit 801, a key reception unit 802, a decryption unit 803, and a result output unit 804.

The ciphertext reception unit 801 receives the converted public-key ciphertext Cpk and the converted symmetric-key ciphertext (Csk', auxC').

The key reception unit 802 receives the user secret key $sk_\Gamma$.

The decryption unit 803 performs a decryption process using the converted public-key ciphertext Cpk, the converted symmetric-key ciphertext (Csk', auxC'), and the user secret key $sk_\Gamma$ so as to calculate the plaintext M.

Specifically, the decryption unit 803 first performs decryption of attribute-based encryption using the user secret key $sk_\Gamma$ corresponding to the decryption enabling condition L and the second converted public-key ciphertext so as to decrypt the key corresponding to the first converted public-key ciphertext.

Next, the decryption unit 803 performs decryption of symmetric-key encryption using the decrypted key corresponding to the first converted public-key ciphertext and the first partial conversion key so as to decrypt the second symmetric-key encryption secret key.

Next, the decryption unit 803 calculates, as the plaintext M, an exclusive-OR of at least part of the converted symmetric-key ciphertext and a value calculated by performing encryption in the counter mode of the block cipher using the decrypted second symmetric-key encryption secret key and the second auxiliary information.

The result output unit 804 outputs the calculated plaintext M.

Figure 9:
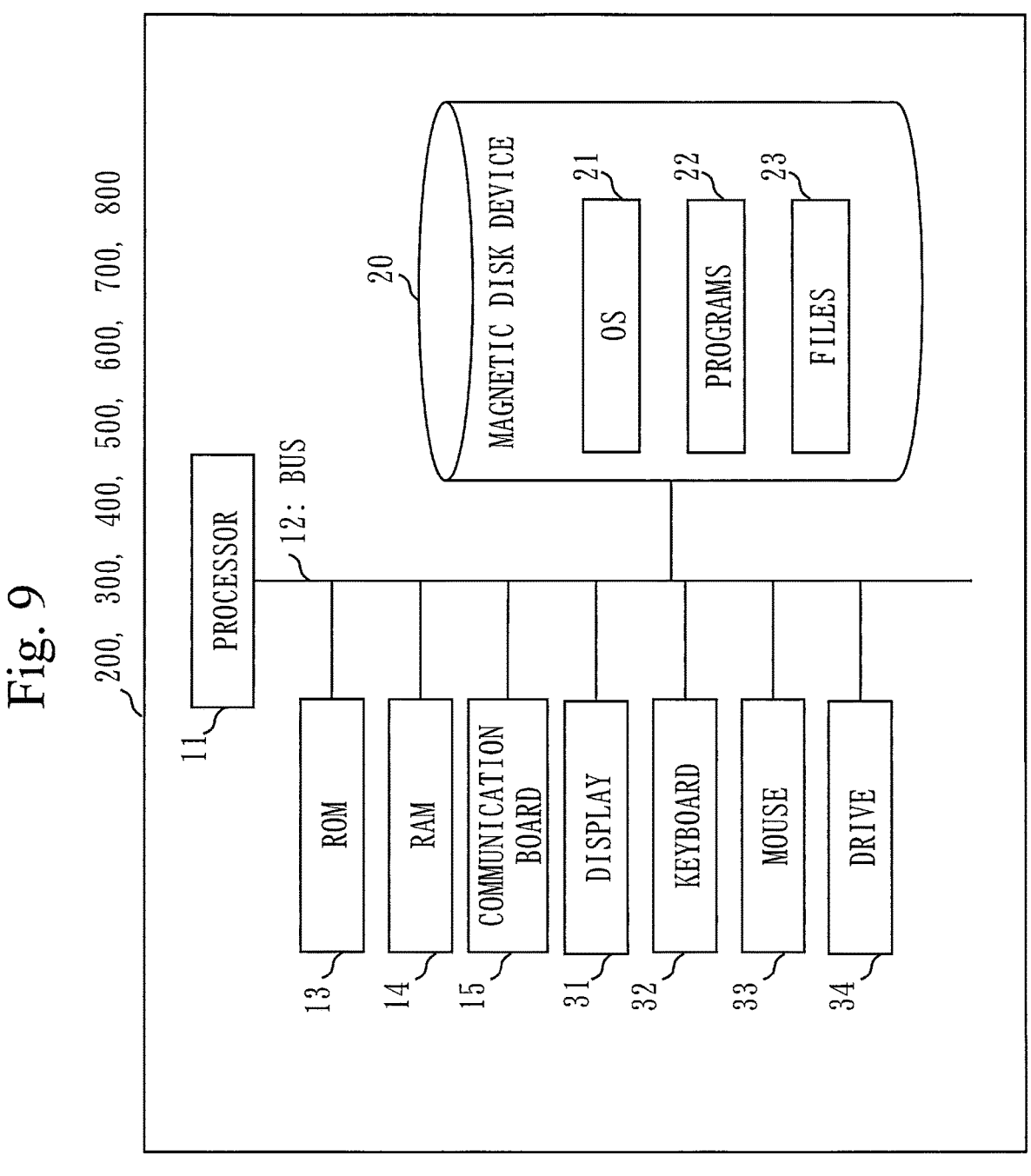
FIG. 9 is a figure illustrating an example of a hardware configuration of each of the devices according to Embodiment 1.

FIG. 9 is a figure illustrating an example of hardware resources of each of the devices according to this embodiment. As illustrated in FIG. 9, each of the devices is a general computer that includes a processor 11 (central processing unit).

The processor 11 is, as a specific example, a central processing unit (CPU), a digital signal processor (DSP), or a graphics processing unit (GPU). The processor 11 is connected with hardware devices such as a read only memory (ROM) 13, a random access memory (RAM) 14, a communication board 15, a display 31 (display device), a keyboard 32, a mouse 33, a drive 34, and a magnetic disk device 20 via a bus 12, and controls these hardware devices. The drive 34 is a device that reads from and writes to a storage medium such as a flexible disk drive (FD), a compact disc (CD), and a digital versatile disc (DVD).

The ROM 13, the RAM 14, the magnetic disk device 20, and the drive 34 are examples of a storage device.

The keyboard 32, the mouse 33, and the communication board 15 are examples of an input device.

The display 31 and the communication board 15 are example of an output device.

The communication board 15 is connected to a communication network such as a LAN, the Internet, or a telephone line with a wire or wirelessly.

The magnetic disk device 20 stores an operating system (OS) 21, programs 22, and files 23.

The programs 22 include programs that execute functions described as each "unit" in this embodiment. The programs are read out and executed by the processor 11. That is, the programs cause a computer to function as each "unit" and cause the computer to execute a procedure or a method of each "unit".

The files 23 include various pieces of data (input, output, determination results, processing results, etc.) used in each "unit" described in this embodiment.

Processes of this embodiment described based on flowcharts or the like are executed using hardware such as the processor 11, the storage device, the input device, and the output device.

What is described as each "unit" may be realized by firmware, software, hardware, or a combination of these.

Any program described in this specification may be recorded in a computer readable non-volatile recording medium. The non-volatile recording medium is, as a specific example, an optical disc or a flash memory. Any program described in this specification may be provided as a program product.

*Description of Operation*

A procedure for operation of each of the devices constituting the ciphertext conversion system 100 is equivalent to a ciphertext conversion method. The ciphertext conversion method is also a generic term for methods executed in each of the devices. A program that realizes the operation of each of the devices constituting the ciphertext conversion system 100 is equivalent to a ciphertext conversion program. The ciphertext conversion program is also a generic term for programs executed in each of the devices.

In the following, before describing the operation of the ciphertext conversion system 100 according to this embodiment, cryptographic techniques and notation used in this embodiment will be described.

Attribute-based encryption is encryption that can be decrypted only by a user who has a user secret key generated using a set of attributes $\Gamma$ that satisfies a decryption condition that is set by the decryption enabling condition L. In this embodiment, attribute-based encryption that allows delegation is used, that is, attribute-based encryption is used in which a change can be made to a ciphertext without decryption, provided that the change restricts the decryption enabling condition. This attribute-based encryption is composed of algorithms including the following processes. Such attribute-based encryption has been achieved in various ways, and is also discussed in Non-Patent Literature 1 and so on.

Process 1: Process that takes, as input, setup ABESETUP, a key length, and so on, and outputs a master secret key msk and a public key pk.

Process 2: Process that takes, as input, user secret key generation ABEKEYGEN, the master secret key msk, and the set of attributes $\Gamma$, and generates a user secret key $sk_\Gamma$ corresponding to the set of attributes $\Gamma$.

Process 3: Process that takes, as input, encryption ABEENC, the public key pk, and the decryption enabling condition L, and generates a key K for symmetric-key encryption and a ciphertext P corresponding to the key K.

Process 4: Process that takes, as input, delegation conversion ABEDER, the public key pk, the ciphertext P, and a decryption enabling condition L', and outputs a ciphertext P' corresponding to the decryption enabling condition L' if the decryption enabling condition L' indicates a condition that is more restrictive than the decryption enabling condition L associated with the ciphertext P.

Process 5: Process that takes, as input, decryption ABEDEC, the user secret key $sk_\Gamma$, and the ciphertext P, and outputs the key K encrypted as the ciphertext P if the set of attributes $\Gamma$ matches the decryption enabling condition L used in generating the ciphertext P.

Common-key encryption is a technique in which a plaintext M is encrypted using a secret key sk, and a ciphertext is decrypted using the secret key sk. The secret key sk is a random value, and encryption SKEENC takes, as input, the secret key sk and the plaintext M, and outputs a ciphertext. Decryption SKEDEC takes, as input, the secret key sk and the ciphertext, and outputs the plaintext M.

Among symmetric-key encryption, an encryption technique in the counter mode using a block cipher is used in this embodiment. Encryption in the counter mode using the block cipher will be denoted as SCTRENC, and decryption in the counter mode using the block cipher will be denoted as SCTRDEC. In the counter mode, the auxiliary information auxC exists, encryption is performed as indicated in [Formula 1], and decryption is performed as indicated in [Formula 2]. An operator+represents an exclusive-OR. The auxiliary information is a counter value.

$$C = SCTRENC(sk, auxC) + M \qquad \text{[Formula 1]}$$

$$M = SCTRDEC(sk, auxC) + C \qquad \text{[Formula 2]}$$

Figure 10:
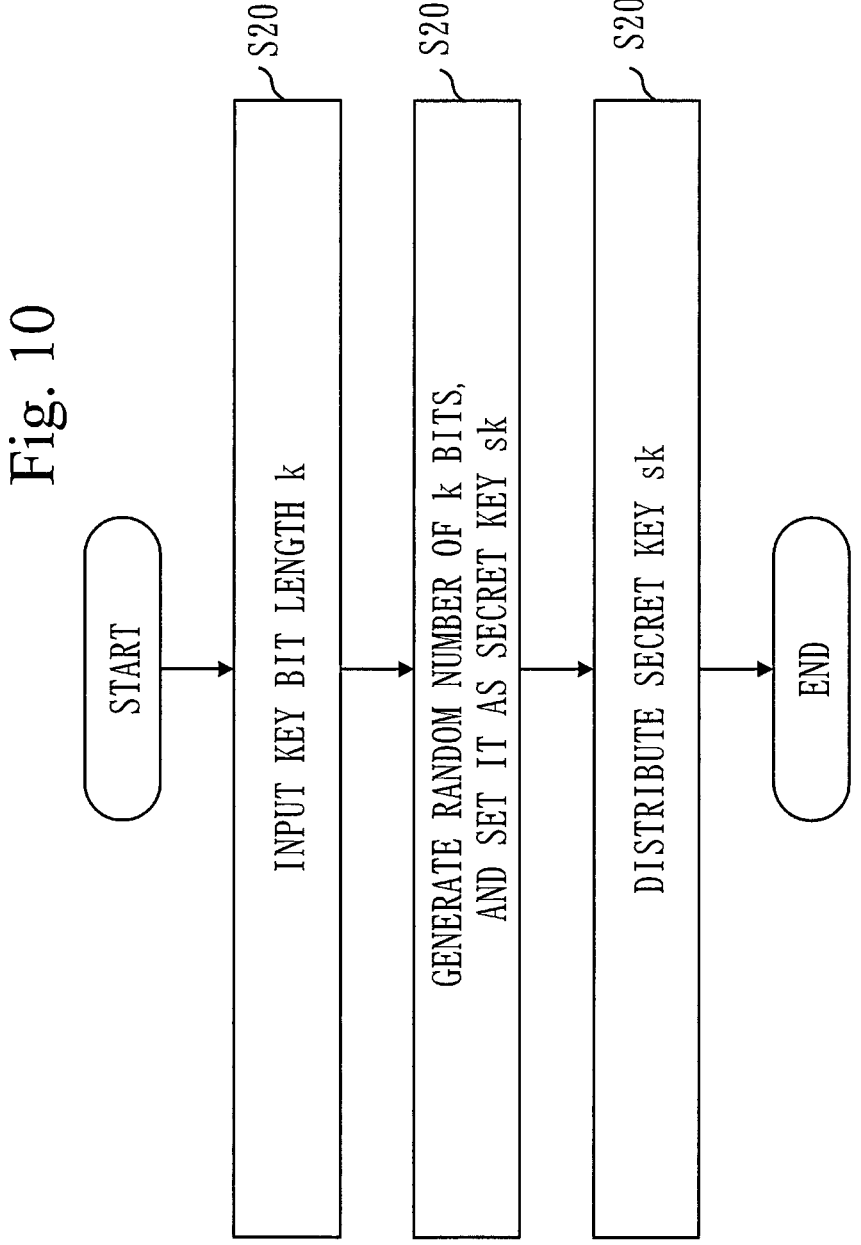
FIG. 10 is a flowchart illustrating operation of the symmetric secret key generation device 200 according to Embodiment 1.

FIG. 10 represents an example of a symmetric secret key generation process. Using FIG. 10, the symmetric secret key generation process will be described.

(Step S201: Information Input Step)

The input unit 201 accepts input of information indicating the key bit length k.

(Step S202: Secret Key Generation Step)

The symmetric-key encryption key generation unit 202 generates a random number of k bits, and sets the generated random number as the secret key sk.

(Step S203: Transmission Step)

The transmission unit 203 transmits the generated secret key sk to each device as appropriate.

Figure 11:
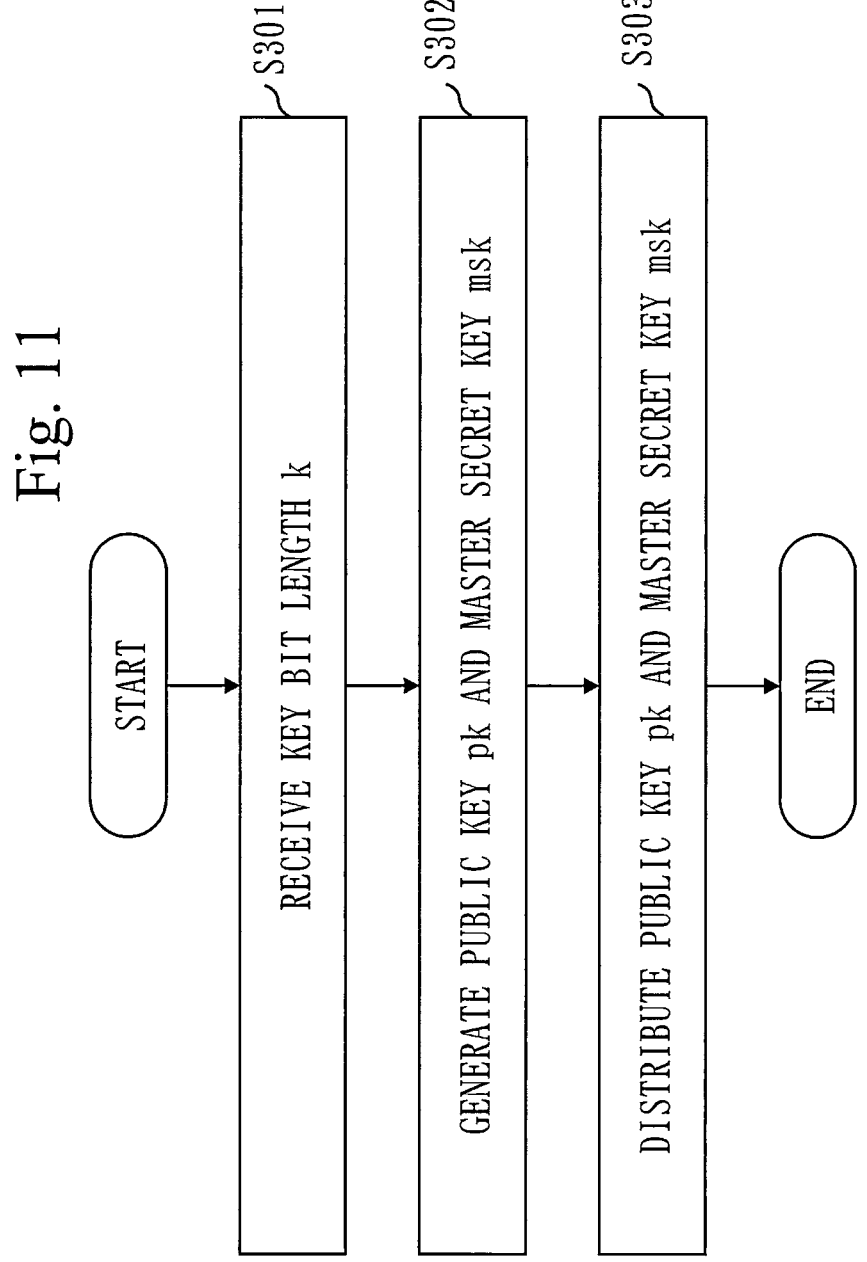
FIG. 11 is a flowchart illustrating operation of the common parameter generation device 300 according to Embodiment 1.

FIG. 11 represents an example of a common parameter generation process. Using FIG. 11, the common parameter generation process will be described.

(Step S301: Information Input Step)

The input unit 301 accepts input of information indicating the key bit length k.

(Step S302: Key Generation Step)

The common parameter generation unit 302 executes setup Setup of attribute-based encryption so as to generate the master secret key msk and the public key pk.

(Step S303: Transmission Step)

The transmission unit 303 transmits the generated master secret key msk and public key pk to each device as appropriate.

Figure 12:
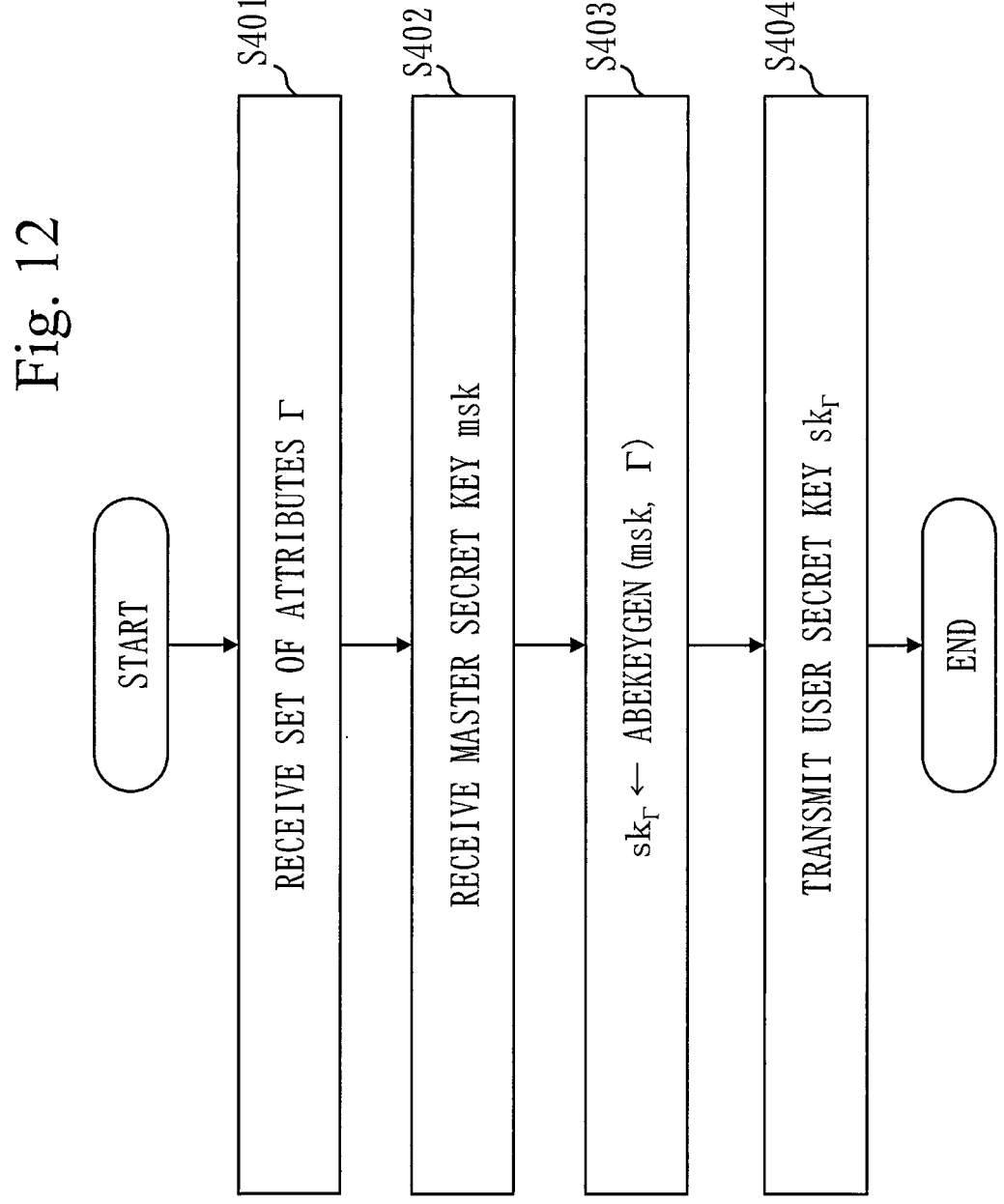
FIG. 12 is a flowchart illustrating operation of the user secret key generation device 400 according to Embodiment 1.

FIG. 12 represents an example of a user secret key generation process. Using FIG. 12, the user secret key generation process will be described.

(Step S401: Attribute Input Step)

The input unit 401 accepts input of information indicating the attribute parameter Γ.

(Step S402: Master Key Reception Step)

The key reception unit 402 receives the master secret key msk.

(Step S403: User Secret Key Generation Step)

The key generation unit 403 executes user secret key generation KeyGen of attribute-based encryption using the attribute parameter Γ and the master secret key msk so as to generate the user secret key sk$_Γ$.

(Step S404: Transmission Step)

The transmission unit 404 transmits the generated user secret key sk$_Γ$ to each device as appropriate.

Figure 13:
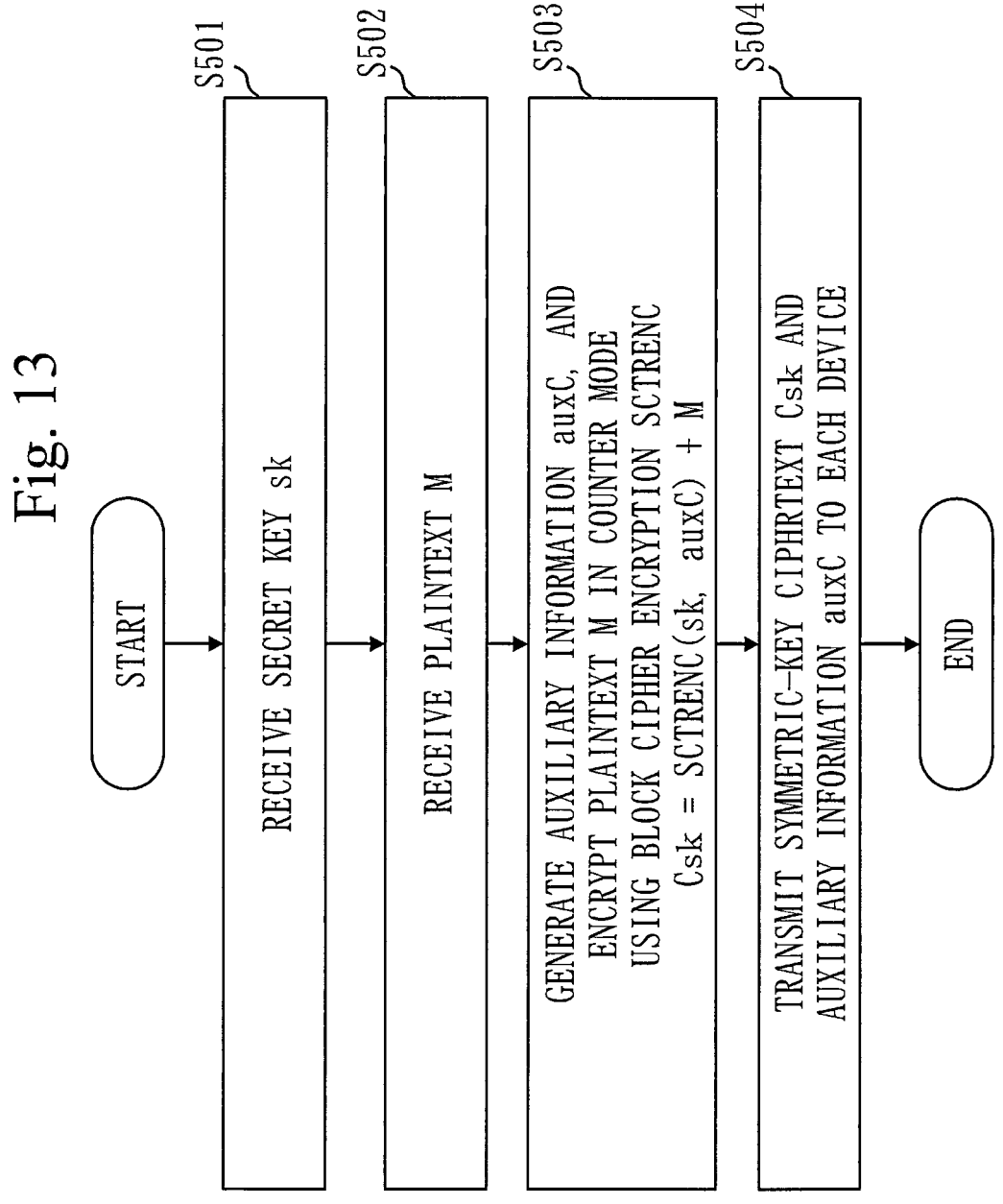
FIG. 13 is a flowchart illustrating operation of the ciphertext generation device 500 according to Embodiment 1.

FIG. 13 represents an example of a ciphertext generation process. Using FIG. 13, the ciphertext generation process will be described.

(Step S501: Key Reception Step)

The key reception unit 502 accepts, as input, the secret key sk.

(Step S502: Plaintext Input Step)

The input unit 501 accepts, as input, information indicating the plaintext M.

(Step S503: Encryption Step)

The encryption unit 503 performs encryption in the counter mode of the block cipher, as indicated in [Formula 3], so as to encrypt the plaintext M. The encryption unit 503 generates a counter value in executing the counter mode as the auxiliary information auxC and sets the symmetric-key ciphertext to be Csk. The secret key sk is the first symmetric-key encryption secret key. The auxiliary information auxC is the first auxiliary information.

$$Csk = SCTRENC(sk, auxC) + M \qquad \text{[Formula 3]}$$

(Step S504: Transmission Step)

The transmission unit 504 transmits the generated symmetric-key ciphertext Csk and auxiliary information auxC to each device as appropriate.

FIG. 14 represents a conversion key generation process. Using FIG. 14, the conversion key generation process will be described.

(Step S601: Key Reception Step)

The key reception unit 601 receives the public key pk, the secret key sk, and the auxiliary information auxC.

(Step 602: Decryption Enabling Condition Reception Step)

The input unit 602 receives information indicating the decryption enabling condition L. The decryption enabling condition L indicates a condition corresponding to allowing decryption for any user to whom the user secret key sk$_Γ$ has been issued. The decryption enabling condition L is the first decryption enabling condition.

(Step 603: Conversion Destination Setting Step)

The conversion destination setting unit 603 executes encryption ABEENC of attribute-based encryption using the public key pk and the decryption enabling condition L, as indicated in [Formula 4]. P is a converted public-key ciphertext, and K is a key generated by decrypting P. P is the first converted public-key ciphertext. K is the key corresponding to the first converted public-key ciphertext.

$$(K, P) = ABEENC(pk, L) \qquad \text{[Formula 4]}$$

(Step S604: Secret Key Generation Step)

The key generation unit 604 generates a new secret key sk'.

(Step S605: Secret Key Encryption Step)

The key generation unit 604 performs encryption of symmetric-key encryption using the secret key sk' as a plaintext and K as a secret key, as indicated in [Formula 5]. The secret key sk' is the second symmetric-key encryption secret key. S1 is the first partial conversion key.

$$S1 = SKEENC(K, sk') \qquad \text{[Formula 5]}$$

(Step S606: Conversion Key Generation Step)

The key generation unit 604 generates new auxiliary information auxC', and performs calculation indicated in [Formula 6] using the generated auxiliary information auxC'. SCTRENC (sk, auxC) is a value calculated by performing encryption in the counter mode of the block cipher using the first symmetric-key encryption secret key and the first auxiliary information. SCTRENC (sk', auxC') is a value calculated by performing encryption in the counter mode of the block cipher using the second symmetric-key encryption secret key and the second auxiliary information. S2 is the second partial conversion key.

$$S2 = SCTRENC(sk, auxC) + SCTRENC(sk', auxC') \qquad \text{[Formula 6]}$$

$$S = (S1, S2)$$

(Step 607: Transmission Step)

The transmission unit 605 transmits the conversion key ck (=(P, S)) to each device as appropriate.

Figure 15:
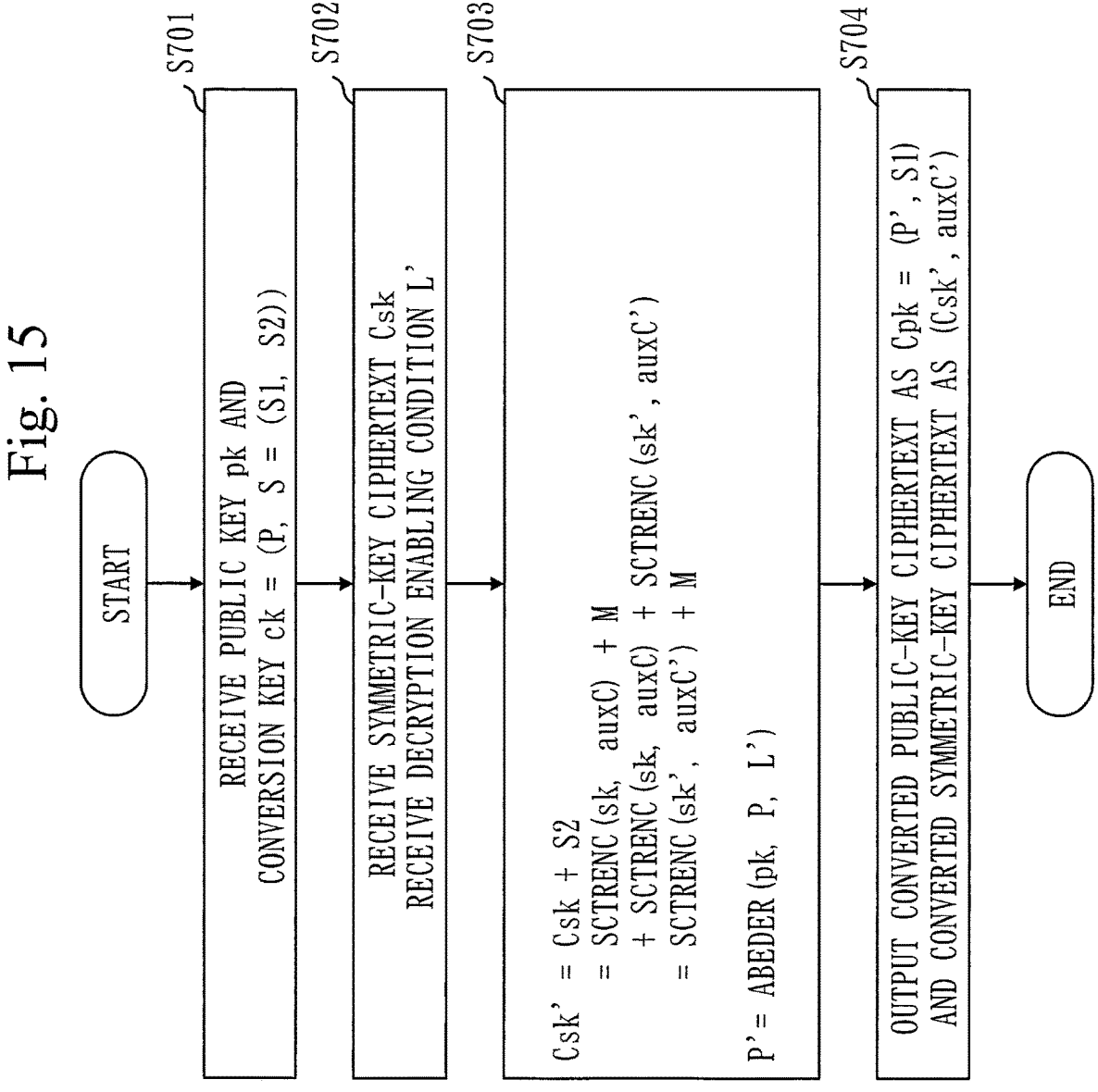
FIG. 15 is a flowchart illustrating operation of the conversion device 700 according to Embodiment 1.

FIG. 15 represents an example of a conversion process. Referring to FIG. 15, the conversion process will be described.

(Step S701: Key Reception Step)

The key reception unit 701 receives the public key pk and the conversion key ck (=(P, S=(S1, S2))).

(Step 702: Input Step)

The ciphertext reception unit 702 receives information indicating the symmetric-key ciphertext Csk.

The input unit 703 receives information indicating the decryption enabling condition L'. The decryption enabling condition L' is the second decryption enabling condition.

(Step 703: Conversion Step)

The conversion unit 704 performs calculation indicated in [Formula 7] using the symmetric-key ciphertext Csk and S2. Note that the right side of [Formula 7] can be transformed as indicated in [Formula 8]. Csk' is at least part of the converted symmetric-key ciphertext to be used to decrypt the plaintext M. The plaintext M is used when the symmetric-key ciphertext Csk is generated.

$$Csk' = Csk + S2 \qquad \text{[Formula 7]}$$

$$\text{[Formula 8]}$$

$$Csk + S2 = SCTRENC(sk, auxC) + M + SCTRENC(sk, auxC) +$$

$$SCTRENC(sk', auxC') = SCTRENC(sk', auxC') + M$$

The conversion unit 704 also performs calculation indicated in [Formula 9]. P' is the second converted public-key ciphertext.

$$P' = ABEDER(pk, P, L')$$ [Formula 9]

(Step 704: Output Step)

The transmission unit 705 sets the converted public-key ciphertext to be Cpk (=(P', S1)), sets the converted symmetric-key ciphertext to be (Csk', auxC'), and transmits the converted public-key ciphertext Cpk and the converted symmetric-key ciphertext (Csk', auxC') to the decryption device 800.

Figure 16:
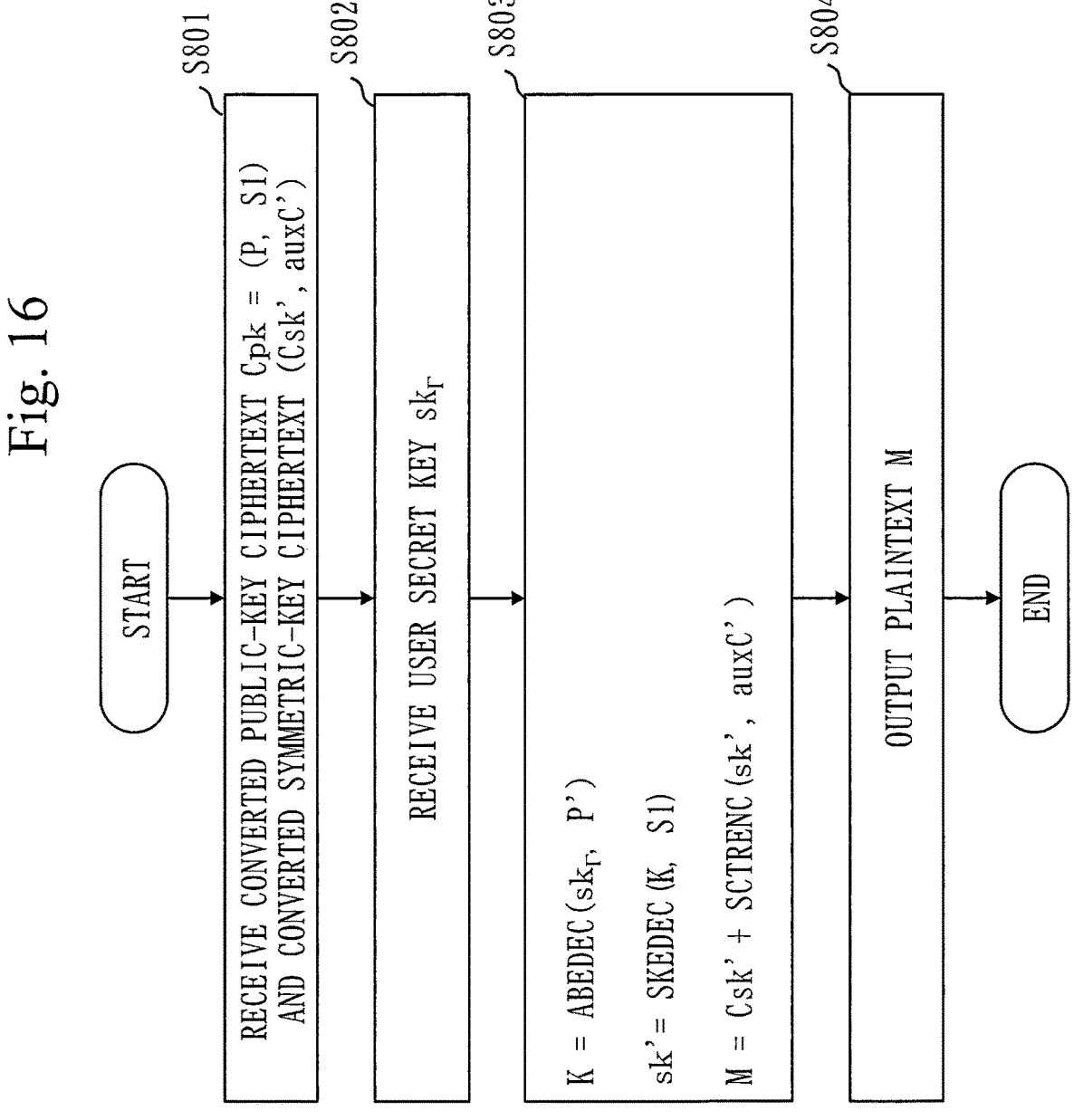
FIG. 16 is a flowchart illustrating operation of the decryption device 800 according to Embodiment 1.

FIG. 16 represents an example of a decryption process. Using FIG. 16, the decryption process will be described.

(Step S801: Ciphertext Reception Step)

The ciphertext reception unit 801 receives the converted public-key ciphertext Cpk (=(P', S1)) and the converted symmetric-key ciphertext (Csk', auxC').

(Step S802: Input Step)

The key reception unit 802 receives the user secret key $sk_\Gamma$.

(Step 803: Decryption Process Step)

First, the decryption unit 803 performs decryption of attribute-based encryption, as indicated in [Formula 10].

Next, the decryption unit 803 performs decryption of symmetric-key encryption, as indicated in [Formula 11].

Next, the decryption unit 803 performs calculation indicated in [Formula 12] so as to obtain the plaintext M.

$$K = ABEDEC(sk_\Gamma, P')$$ [Formula 10]

$$sk' = SKEDEC(K, S1)$$ [Formula 11]

$$M = Csk' + SCTRENC(sk', auxC')$$ [Formula 12]

(Step 804: Output Step)

The result output unit 804 outputs data indicating the plaintext M obtained by the decryption unit 803.

Description of Effects of Embodiment 1

As described above, according to this embodiment, a ciphertext of the symmetric-key encryption scheme can be converted, without being decrypted, to a ciphertext of the public-key encryption scheme.

In addition, according to this embodiment, it is not necessary to generate a conversion key for converting a ciphertext of the symmetric-key encryption scheme to a ciphertext of the public-key encryption scheme for each ciphertext. Therefore, according to this embodiment, the cost of generating a conversion key can be reduced, and the number of times a secret key is called to generate a conversion key can also be reduced, so that enhancement of security can be realized. In addition, it is possible to convert a ciphertext to a ciphertext of public-key encryption in a resource-saving device that is not capable of performing operations and so on of public-key encryption.

*Other Configurations*

Variation 1

Figure 17:
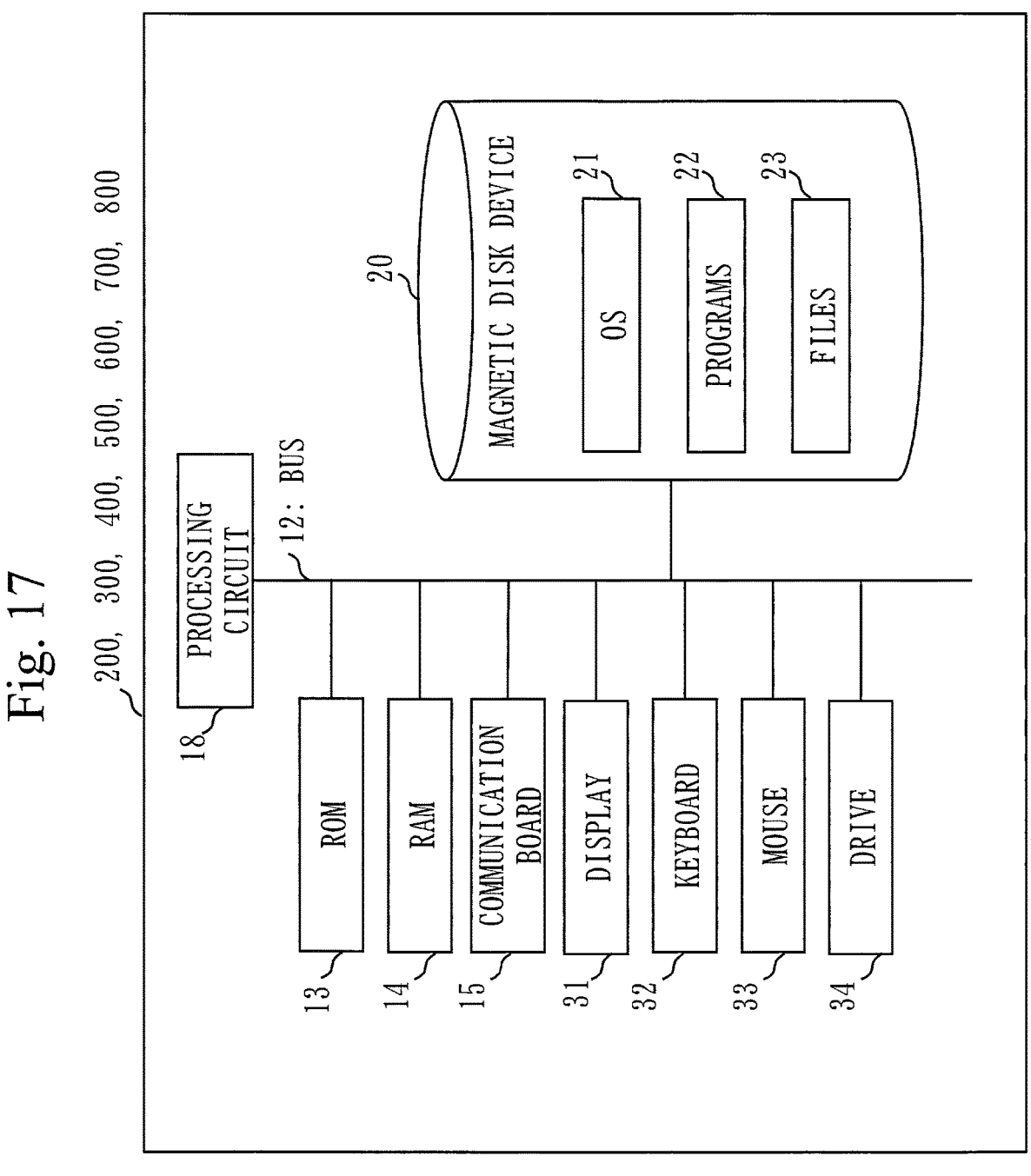
FIG. 17 is a figure illustrating an example of a hardware configuration of each of the devices according to a variation of Embodiment 1.

FIG. 17 illustrates an example of a hardware configuration of each of the devices according to this variation.

Each of the devices includes a processing circuit 18 in place of the processor 11, in place of the processor 11 and the ROM 13, in place of the processor 11 and the RAM 14, or in place of the processor 11, the ROM 13, and the RAM 14.

The processing circuit 18 is hardware that realizes at least part of the units included in each of the devices.

The processing circuit 18 may be dedicated hardware, or may be a processor that executes programs stored in the RAM 14.

When the processing circuit 18 is dedicated hardware, the processing circuit 18 is, as a specific example, a single circuit, a composite circuit, a programmed processor, a parallel-programmed processor, an application specific integrated circuit (ASIC), a field programmable gate array (FPGA), or a combination of these.

Each of the devices may include a plurality of processing circuits as an alternative to the processing circuit 18. The plurality of processing circuits share the role of the processing circuit 18.

In each of the devices, some functions may be realized by dedicated hardware, and the remaining functions may be realized by software or firmware.

As a specific example, the processing circuit 18 is realized by hardware, software, firmware, or a combination of these.

The processor 11, the ROM 13, the RAM 14, and the processing circuit 18 are collectively called "processing circuitry". That is, the functions of the functional constituent elements of each of the devices are realized by the processing circuitry.

Other Embodiments

Embodiment 1 has been described, and portions of this embodiment may be implemented in combination. Alternatively, this embodiment may be partially implemented. Alternatively, this embodiment may be modified in various ways as necessary, and may be implemented as a whole or partially in any combination.

The embodiment described above is an essentially preferable example, and is not intended to limit the present disclosure as well as the applications and scope of uses of the present disclosure. The procedures described using the flowcharts or the like may be modified as appropriate.

REFERENCE SIGNS LIST

11: processor; 12: bus; 13: ROM; 14: RAM; 15: communication board; 18: processing circuit; 20: magnetic disk device; 21: OS; 22: programs; 23: files; 31: display; 32: keyboard; 33: mouse; 34: drive; 100: ciphertext conversion system; 101: Internet; 200: symmetric secret key generation device; 201: input unit; 202: symmetric-key encryption key generation unit; 203: transmission unit; 300: common parameter generation device; 301: input unit; 302: common parameter generation unit; 303: transmission unit; 400: user secret key generation device; 401: input unit; 402: key reception unit; 403: key generation unit; 404: transmission unit; 500: ciphertext generation device; 501: input unit; 502: key reception unit; 503: encryption unit; 504: transmission unit; 600: conversion key generation device; 601: key reception unit; 602: input unit; 603: conversion destination setting unit; 604: key generation unit; 605: transmission unit; 700: conversion device; 701: key reception unit; 702: ciphertext reception unit; 703: input unit; 704: conversion unit; 705: transmission unit; 800: decryption device; 801: ciphertext reception unit; 802: key reception unit; 803: decryption unit; 804: result output unit; auxC, auxC': auxiliary information; ck: conversion key; Csk: symmetric-key ciphertext; Cpk:

converted public-key ciphertext; L, L': decryption enabling condition; M: plaintext; msk: master secret key; pk: public key; sk, sk': secret key; $sk_\Gamma$: user secret key.

The invention claimed is:

1. A ciphertext conversion system comprising:
a conversion key generation device including
processing circuitry to
perform encryption of a public-key encryption scheme using a public key and a first decryption enabling condition, so as to generate a first converted public-key ciphertext and a key corresponding to the first converted public-key ciphertext,
perform encryption of a symmetric-key encryption scheme using a second symmetric-key encryption secret key as a plaintext and the key corresponding to the first converted public-key ciphertext as a secret key, so as to generate a first partial conversion key, and
calculate, as a second partial conversion key, an exclusive-OR of a value calculated by performing encryption in a counter mode of a block cipher using a first symmetric-key encryption secret key and first auxiliary information and a value calculated by performing encryption in the counter mode of the block cipher using the second symmetric-key encryption secret key and second auxiliary information; and
a conversion device including
processing circuitry to
calculate, as at least part of a converted symmetric-key ciphertext to be used to decrypt a plaintext used in generating a symmetric-key ciphertext, an exclusive-OR of the symmetric-key ciphertext and the second partial conversion key, the symmetric-key ciphertext being an exclusive-OR of the plaintext and a value calculated by performing encryption in the counter mode of the block cipher using the first symmetric-key encryption secret key and the first auxiliary information.

2. The ciphertext conversion system according to claim 1, wherein the converted symmetric-key ciphertext is composed of at least part of the converted symmetric-key ciphertext and the second auxiliary information.

3. The ciphertext conversion system according to claim 1, wherein the public-key encryption scheme is an attribute-based encryption scheme.

4. The ciphertext conversion system according to claim 2, wherein the public-key encryption scheme is an attribute-based encryption scheme.

5. The ciphertext conversion system according to claim 3, wherein the processing circuitry of the conversion device performs delegation conversion of the attribute-based encryption scheme using the public key, the first converted public-key ciphertext, and a second decryption enabling condition, so as to generate a second converted public-key ciphertext, the second decryption enabling condition being a condition that is more restrictive than the first decryption enabling condition.

6. The ciphertext conversion system according to claim 4, wherein the processing circuitry of the conversion device performs delegation conversion of the attribute-based encryption scheme using the public key, the first converted public-key ciphertext, and a second decryption enabling condition, so as to generate a second converted public-key ciphertext, the second decryption enabling condition being a condition that is more restrictive than the first decryption enabling condition.

7. The ciphertext conversion system according to claim 5, further comprising
a decryption device including
processing circuitry to
perform decryption of attribute-based encryption using a user secret key corresponding to the first decryption enabling condition and the second converted public-key ciphertext, so as to decrypt the key corresponding to the first converted public-key ciphertext,
perform decryption of symmetric-key encryption using the decrypted key corresponding to the first converted public-key ciphertext and the first partial conversion key, so as to decrypt the second symmetric-key encryption secret key, and
calculate, as the plaintext, an exclusive-OR of at least part of the converted symmetric-key ciphertext and a value calculated by performing encryption in the counter mode of the block cipher using the decrypted second symmetric-key encryption secret key and the second auxiliary information.

8. The ciphertext conversion system according to claim 6, further comprising
a decryption device including
processing circuitry to
perform decryption of attribute-based encryption using a user secret key corresponding to the first decryption enabling condition and the second converted public-key ciphertext, so as to decrypt the key corresponding to the first converted public-key ciphertext,
perform decryption of symmetric-key encryption using the decrypted key corresponding to the first converted public-key ciphertext and the first partial conversion key, so as to decrypt the second symmetric-key encryption secret key, and
calculate, as the plaintext, an exclusive-OR of at least part of the converted symmetric-key ciphertext and a value calculated by performing encryption in the counter mode of the block cipher using the decrypted second symmetric-key encryption secret key and the second auxiliary information.

9. A ciphertext conversion method comprising:
performing encryption of a public-key encryption scheme using a public key and a first decryption enabling condition, so as to generate a first converted public-key ciphertext and a key corresponding to the first converted public-key ciphertext, by a conversion key generation device, which is a computer;
performing encryption of a symmetric-key encryption scheme using a second symmetric-key encryption secret key as a plaintext and the key corresponding to the first converted public-key ciphertext as a secret key, so as to generate a first partial conversion key, by the conversion key generation device;
calculating, as a second partial conversion key, an exclusive-OR of a value calculated by performing encryption in a counter mode of a block cipher using a first symmetric-key encryption secret key and first auxiliary information and a value calculated by performing encryption in the counter mode of the block cipher using the second symmetric-key encryption secret key and second auxiliary information, by the conversion key generation device; and
calculating, as at least part of a converted symmetric-key ciphertext to be used to decrypt a plaintext used in generating a symmetric-key ciphertext, an exclusive- OR of the symmetric-key ciphertext and the second partial conversion key, the symmetric-key ciphertext being an exclusive-OR of the plaintext and a value calculated by performing encryption in the counter mode of the block cipher using the first symmetric-key encryption secret key and the first auxiliary information, by a conversion device, which is a computer.

10. A non-transitory computer readable medium storing a ciphertext conversion program that causes a conversion key generation device, which is a computer, to execute a conversion destination setting process and a key generation process, and causes a conversion device, which is a computer, to execute a conversion process, the conversion destination setting process being a process of performing encryption of a public-key encryption scheme using a public key and a first decryption enabling condition, so as to generate a first converted public-key ciphertext and a key corresponding to the first converted public-key ciphertext, the key generation process being a process of performing encryption of a symmetric-key encryption scheme using a second symmetric-key encryption secret key as a plaintext and the key corresponding to the first converted public-key ciphertext as a secret key, so as to generate a first partial conversion key, and calculating, as a second partial conversion key, an exclusive-OR of a value calculated by performing encryption in a counter mode of a block cipher using a first symmetric-key encryption secret key and first auxiliary information and a value calculated by performing encryption in the counter mode of the block cipher using the second symmetric-key encryption secret key and second auxiliary information, the conversion process being a process of calculating, as at least part of a converted symmetric-key ciphertext to be used to decrypt a plaintext used in generating a symmetric-key ciphertext, an exclusive-OR of the symmetric-key ciphertext and the second partial conversion key, the symmetric-key ciphertext being an exclusive-OR of the plaintext and a value calculated by performing encryption in the counter mode of the block cipher using the first symmetric-key encryption secret key and the first auxiliary information.

* * * * *